United States Patent
Kadomatsu

(10) Patent No.: US 9,665,238 B2
(45) Date of Patent: May 30, 2017

(54) INPUT CONTROL DEVICE, THIN-CLIENT SYSTEM, INPUT CONTROL METHOD, AND RECORDING MEDIUM

(71) Applicant: NEC Solution Innovators, Ltd., Tokyo (JP)

(72) Inventor: Yasuki Kadomatsu, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 42 days.

(21) Appl. No.: 14/423,673

(22) PCT Filed: Aug. 28, 2013

(86) PCT No.: PCT/JP2013/073009
§ 371 (c)(1),
(2) Date: Feb. 24, 2015

(87) PCT Pub. No.: WO2014/034725
PCT Pub. Date: Mar. 6, 2014

(65) Prior Publication Data
US 2015/0324085 A1    Nov. 12, 2015

(30) Foreign Application Priority Data

Aug. 31, 2012   (JP) ................................. 2012-192536

(51) Int. Cl.
*G06F 3/041* (2006.01)
*G06F 3/0481* (2013.01)
(Continued)

(52) U.S. Cl.
CPC .......... *G06F 3/04812* (2013.01); *G06F 3/038* (2013.01); *G06F 3/041* (2013.01);
(Continued)

(58) Field of Classification Search
CPC ........ G06F 3/038; G06F 3/041; G06F 3/0416; G06F 3/04812; G06F 3/0482;
(Continued)

(56) References Cited

U.S. PATENT DOCUMENTS

2004/0100451 A1* 5/2004 Okada .................... G06F 3/038
345/173
2005/0024326 A1* 2/2005 Betts-LaCroix ...... G06F 3/0416
345/156
(Continued)

FOREIGN PATENT DOCUMENTS

CN    101727238 A    6/2010
CN    102117177 A    7/2011
(Continued)

OTHER PUBLICATIONS

Korean Office Action issued in corresponding Korean Application No. 10-2015-7004754, dated Mar. 2, 2016, 27 pages.
(Continued)

*Primary Examiner* — Kumar Patel
*Assistant Examiner* — Insa Sadio
(74) *Attorney, Agent, or Firm* — Wilmer Cutler Pickering Hale and Dorr LLP

(57) ABSTRACT

The display control unit of an input control device displays an image containing an operation target region (OB) on a display unit, and an operation verification unit obtains the contact coordinates (CO) indicating a position where a user contacted a touch panel (TD). The display control unit displays a pointer (PO) in a manner such that the direction of a pointer vector (CP) from the contact coordinates (CO) toward the pointer (PO) substantially matches the direction from the center coordinates (CE) of the touch panel display (TD) toward the contact coordinates, and the size of the
(Continued)

pointer vector (CP) increases according to an increase in the size (LC) of the contact vector (CC).

9 Claims, 20 Drawing Sheets

(51) Int. Cl.
    *G06F 3/038*     (2013.01)
    *G06F 3/0482*     (2013.01)
    *G06F 3/0488*     (2013.01)
    *G09G 5/08*     (2006.01)
    *G09G 5/38*     (2006.01)
    *G06F 3/0484*     (2013.01)

(52) U.S. Cl.
    CPC .......... *G06F 3/0482* (2013.01); *G06F 3/0488* (2013.01); *G06F 3/04842* (2013.01); *G09G 5/08* (2013.01); *G09G 5/38* (2013.01)

(58) Field of Classification Search
    CPC ..... G06F 3/04842; G06F 3/0488; G09G 5/08; G09G 5/38
    See application file for complete search history.

(56) References Cited

U.S. PATENT DOCUMENTS

| | | | |
|---|---|---|---|
| 2008/0036745 | A1 | 2/2008 | Betts-LaCroix et al. |
| 2010/0103097 | A1* | 4/2010 | Shiina .................. G06F 3/0488 345/157 |
| 2010/0271301 | A1* | 10/2010 | Ohshita .................. G06F 1/169 345/158 |
| 2011/0164060 | A1* | 7/2011 | Miyazawa ............ G06F 1/1643 345/660 |
| 2011/0247067 | A1* | 10/2011 | Hirose .................. G06F 3/0488 726/19 |

FOREIGN PATENT DOCUMENTS

| | | |
|---|---|---|
| CN | 102122226 A | 7/2011 |
| JP | H11-024841 A | 1/1999 |
| JP | 2003-186620 A | 7/2003 |
| JP | 2004-086735 A | 3/2004 |
| JP | 2010-102474 A | 5/2010 |
| JP | 2010-257328 A | 11/2010 |
| JP | 2011-028524 A | 2/2011 |
| JP | 2011-141753 A | 7/2011 |
| JP | 2011-216043 A | 10/2011 |
| KR | 10-2012-0046807 A | 5/2012 |

OTHER PUBLICATIONS

International Search Report corresponding to PCT/JP2013/073009 mailed Oct. 1, 2013 (2 pages).
Extended European Search Report corresponding to European Application No. 13832021.3, dated Jan. 5, 2016, 9 pages.
Chinese Office Action issued by the Patent Office of the People's Republic of China for Chinese Application No. 201380052842.5 dated Mar. 20, 2017 (23 pages).

* cited by examiner

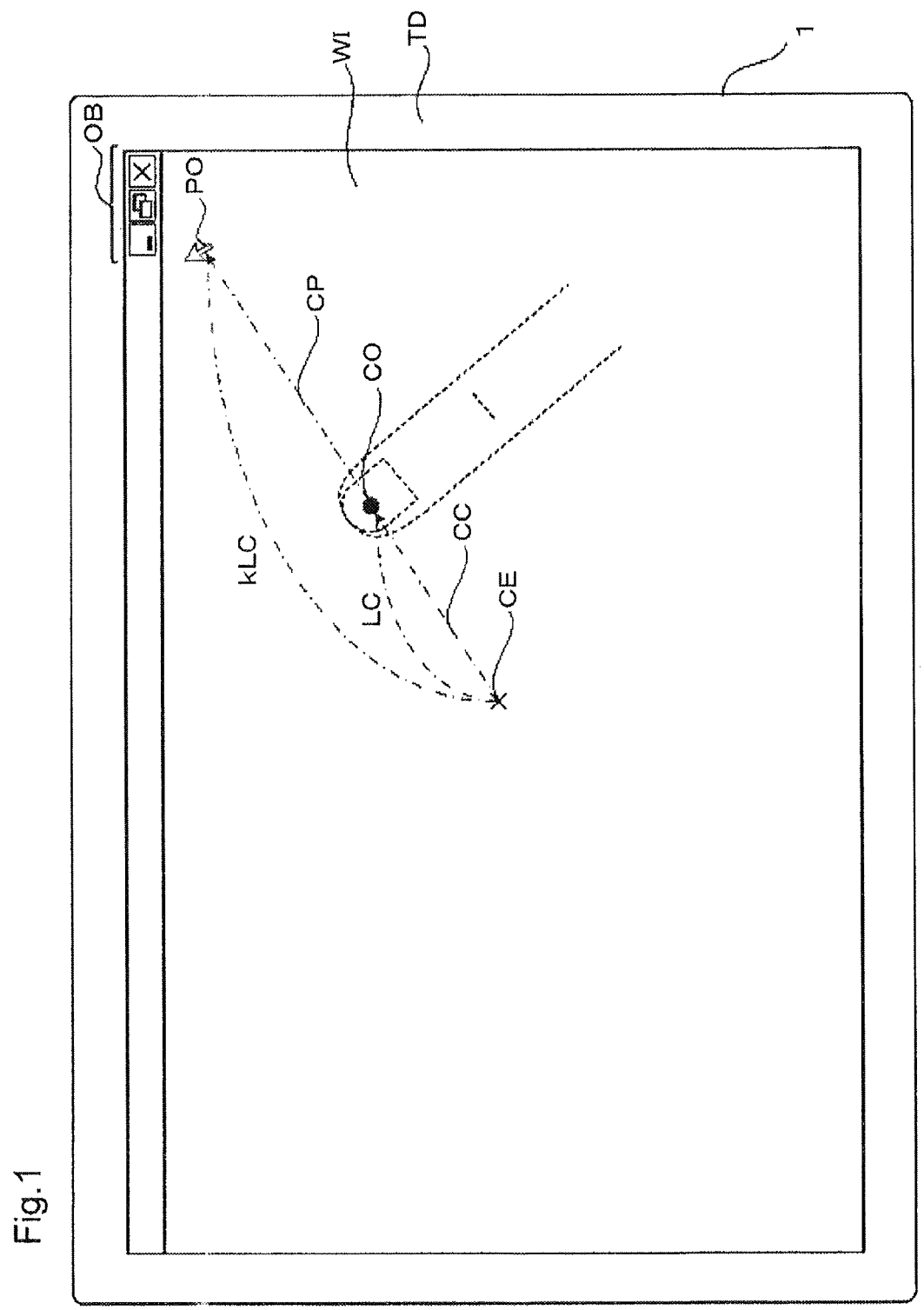

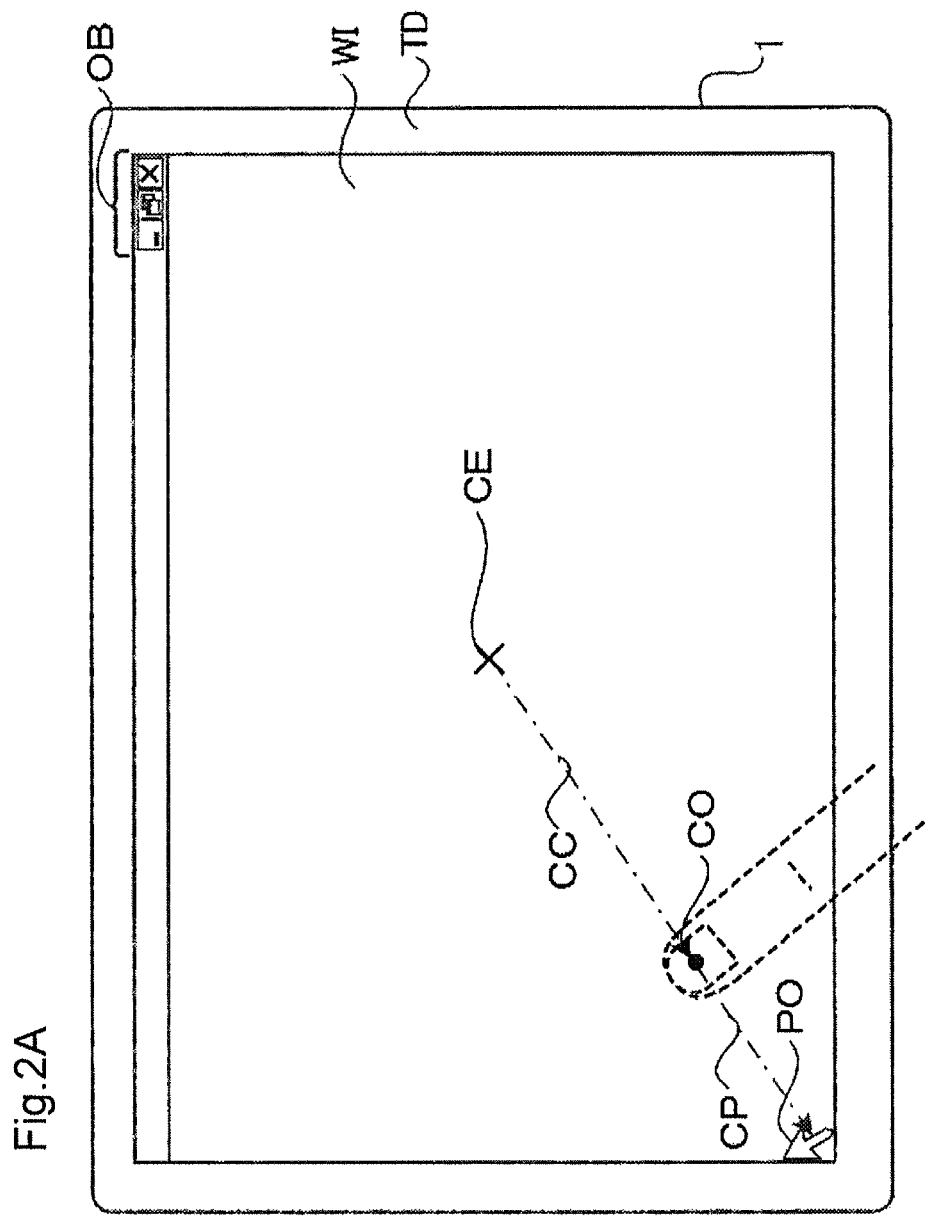

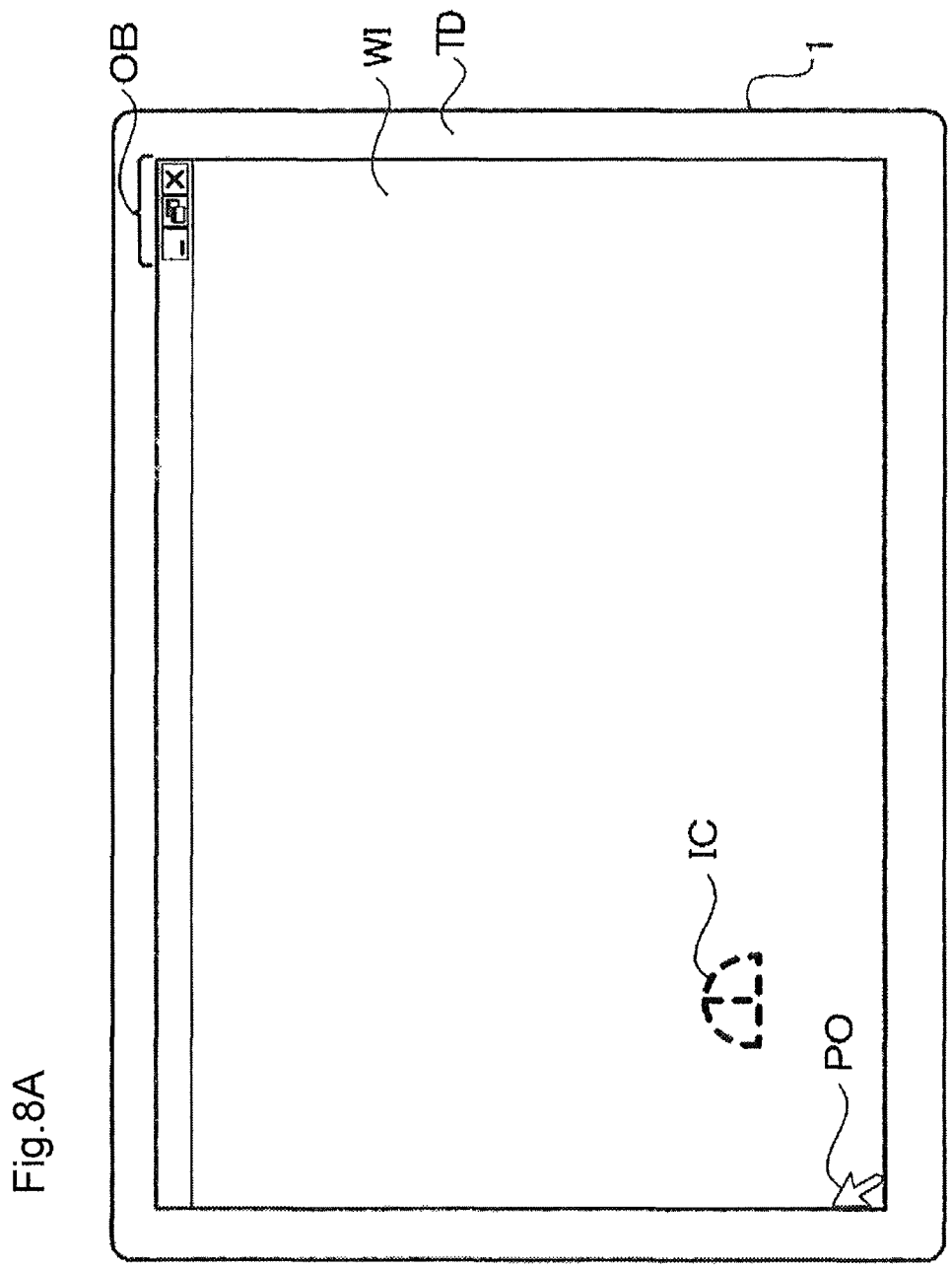

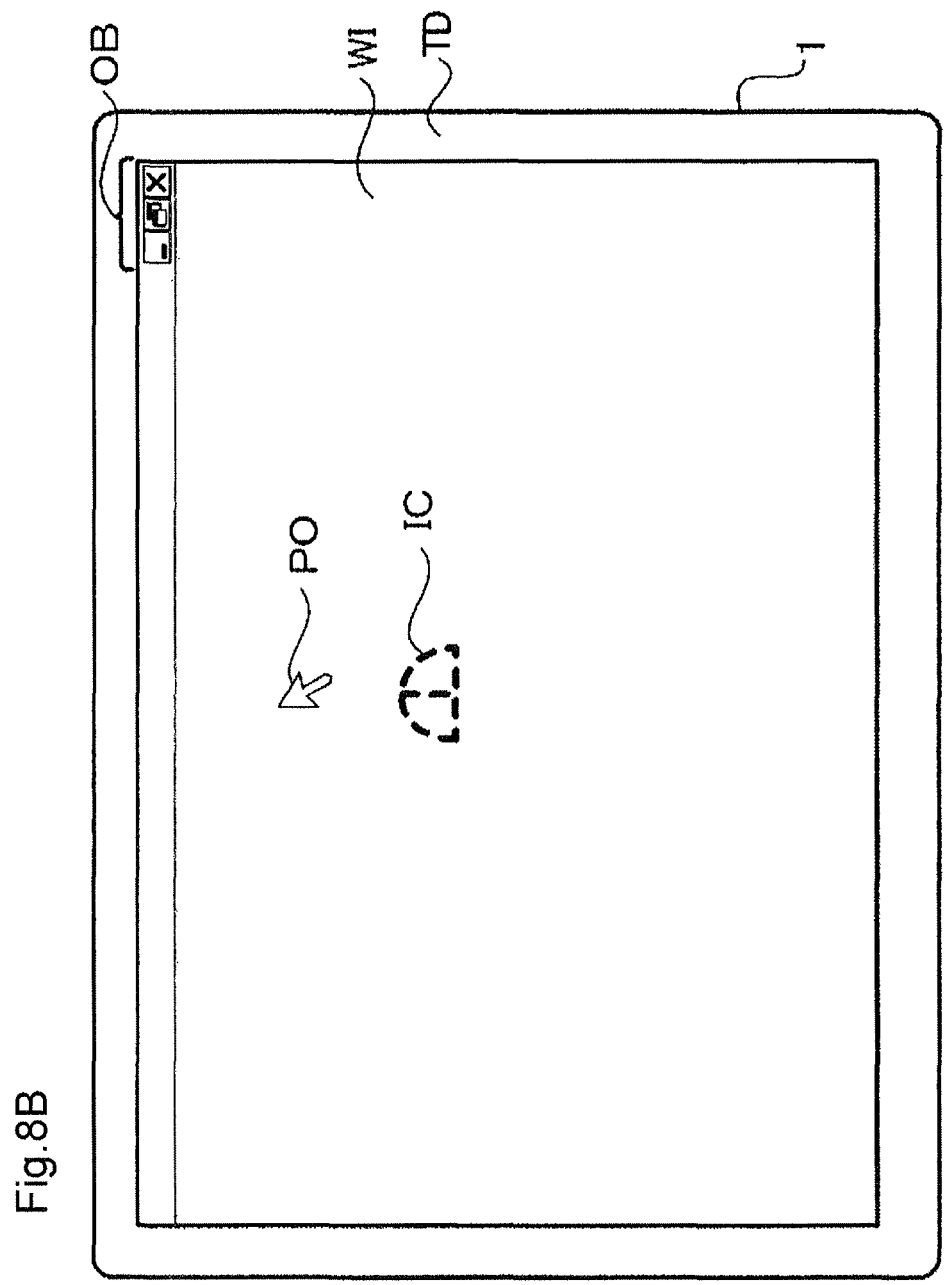

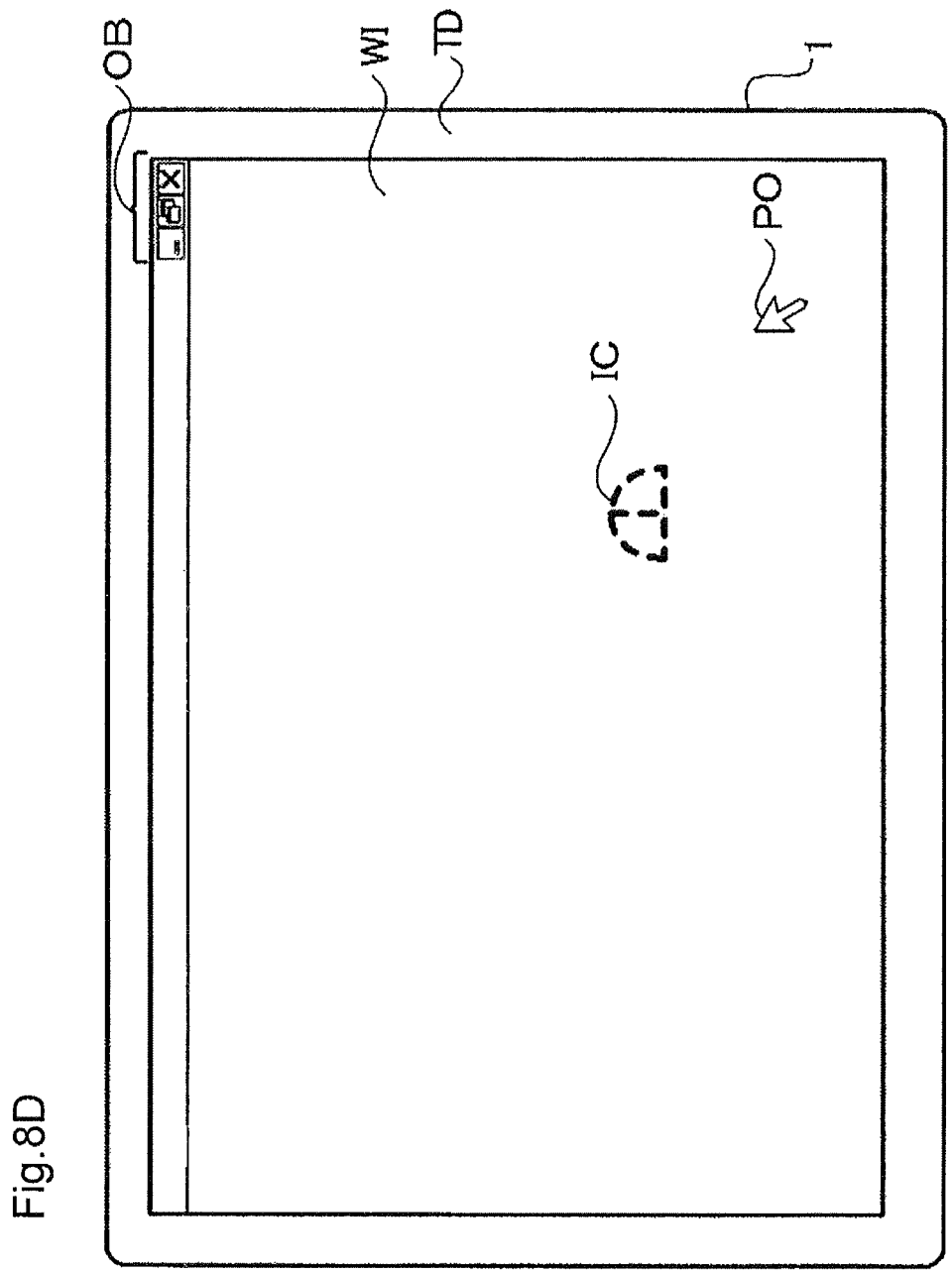

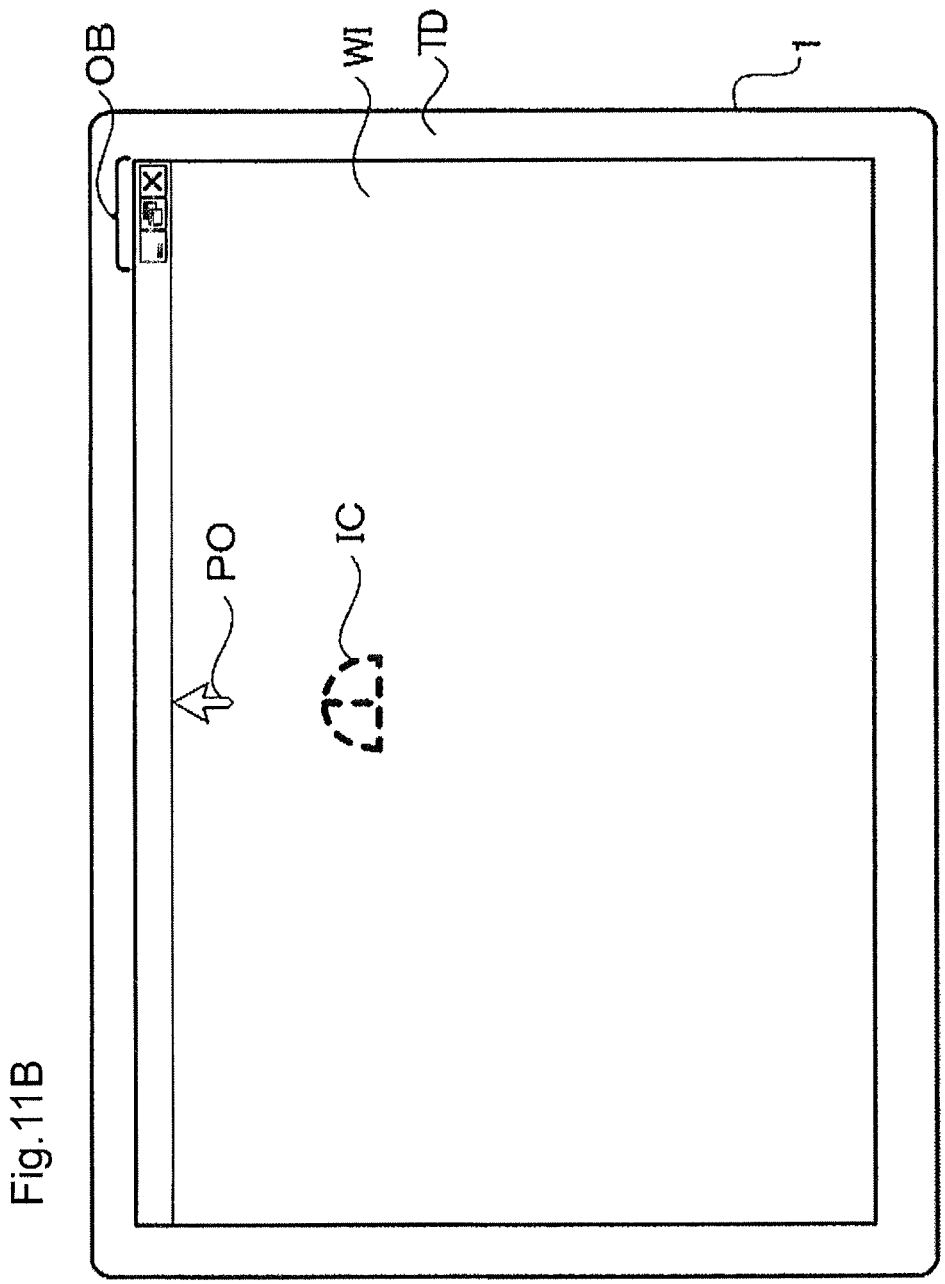

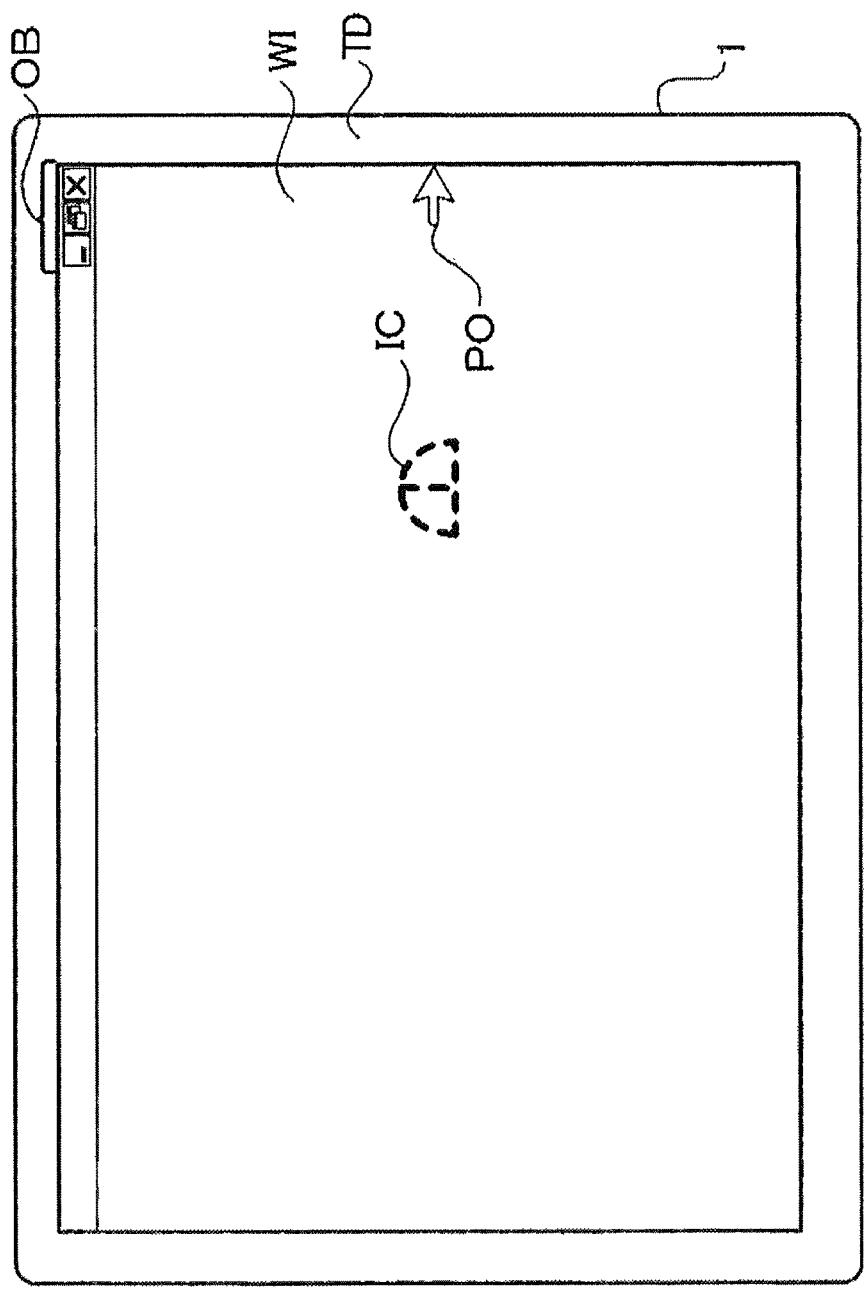

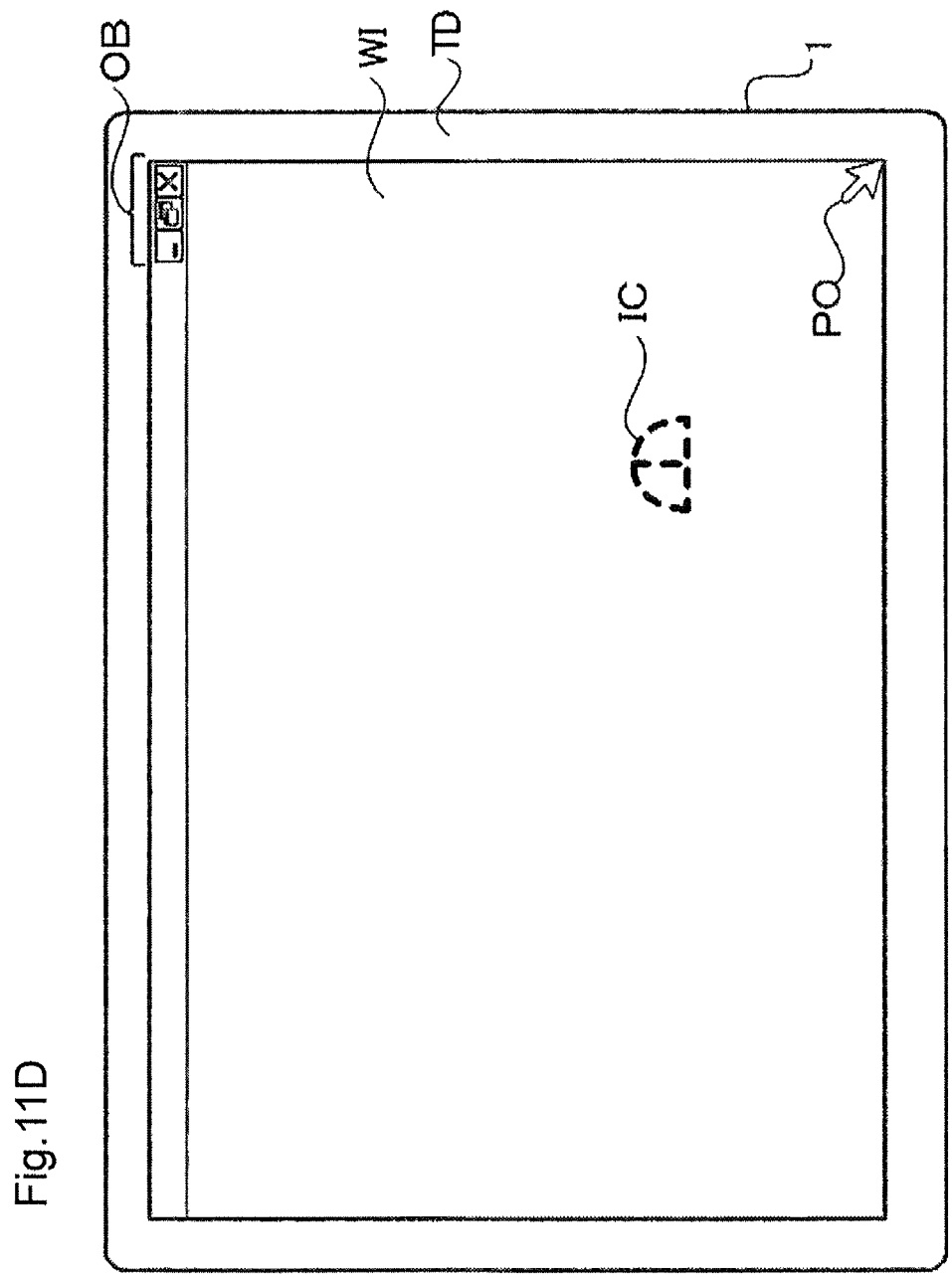

INPUT CONTROL DEVICE, THIN-CLIENT SYSTEM, INPUT CONTROL METHOD, AND RECORDING MEDIUM

CROSS-REFERENCE TO RELATED APPLICATIONS

This application is a national stage application of International Application No. PCT/JP2013/073009 entitled "Input Control Device, Thin-Client System, Input Control Method, And Recording Medium," filed on Aug. 28, 2013 which claims the benefit of the priority of Japanese Patent Application No. 2012-192536, filed on Aug. 31, 2012, the disclosures of each of which are hereby incorporated by reference in their entirety.

TECHNICAL FIELD

The present invention relates to an input control device, a thin-client system, an input control method, and a recording medium.

BACKGROUND ART

A technology has been known in which a user indicates an operation object such as an icon using a pointer on a window displayed by a touch panel display (for example, PTLs 1 to 3).

CITATION LIST

Patent Literature

PTL 1: Japanese Unexamined Patent Application Publication No. 2011-028524
PTL 2: Japanese Unexamined Patent Application Publication No. 2010-102474
PTL 3: Japanese Unexamined Patent Application Publication No. H11-024841

SUMMARY OF INVENTION

Technical Problem

According to the technology disclosed in PTLs 1 to 3, a pointer is displayed at a position where a user touches a touch panel display, or in a neighborhood thereof. Therefore, when the user intends to indicate using a pointer an operation object such as an icon displayed near an outer frame of a touch panel display, it is required to touch an area near the outer frame of the touch panel display where the operation object is displayed. However, when the user intends to touch an area near the outer frame of the touch panel display, especially areas near the four corners of a square touch panel display, the touch as intended may be occasionally hindered by the outer frame of the touch panel display. In such a case, it has been difficult to indicate with a pointer an operation object displayed near the outer frame of the touch panel display, especially near the four corners of the square touch panel display by the technology disclosed in PTLs 1 to 3.

The present invention is made in view of such situations, and has an object to provide an input control device, a thin-client system, an input control method, and a recording medium, with which a user can easily indicate with a pointer an operation object displayed near an outer frame of a touch panel display.

Solution to Problem

To achieve the above object, an input control device according to a first aspect of the present invention includes:
a touch panel display;
an image display means for displaying an image including operation target regions on the touch panel display;
a storage means for storing event correspondence information exhibiting correspondence of an event occurred in each of the operation target regions to a piece of event information, in each of the operation target regions;
an operation recognition means for acquiring a contact coordinate of a position at which a user has touched the touch panel display;
a pointer displaying means for displaying a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector; and
an event information generation means for generating a piece of event information corresponding to an event occurred in an operation target region referring to the event correspondence information, in a case where an indicated coordinate, which is a coordinate of a position indicated by the pointer, is judged to have entered and/or exited any operation target region by deciding whether the indicated coordinate is within any of the operation target regions or not.

A thin-client system according to a second aspect of the present invention, that has an input control device with a touch panel display and a server connected with the input control device via a network, includes:
the server includes an image transmission means for transmitting image information showing an image including operation target regions to the input control device,
the input control device includes:
an image receiving means for receiving the image information from the server,
an image display means for displaying the image including operation target regions on the touch panel display based on the image information,
an operation recognition means for acquiring a contact coordinate of a position at which a user touched the touch panel display,
a pointer displaying means for displaying a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector, and
a position transmission means for transmitting positional information including an indicated coordinate, which is a coordinate of a position indicated by the pointer, to the server; and
the server further includes
a storage means for storing event correspondence information exhibiting correspondence of an event occurred in each of the operation target regions to a piece of event information in each of the operation target regions, and processing information exhibiting correspondence of the event information to a processing, a position receiving means for receiving the positional information from the input control device, an event information generation means for generating a piece of event information corresponding to an event occurred in an operation target region referring to the event correspondence information, in a case where the indicated coordinate is judged to have entered and/or exited any operation target region by deciding based on the positional information whether the indicated coordinate is within any of the operation target regions or not, and an execution means for executing a processing corresponded to the event information referring to the processing information.

To achieve the above object, an input control method according to a third aspect of the present invention includes;

an image displaying step for displaying an image including operation target regions on a touch panel display;

an operation recognition step for acquiring a contact coordinate of a position at which a user has touched the touch panel display;

a pointer displaying step for displaying a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector; and an event information generation step for generating a piece of event information corresponding to an event occurred in an operation target region referring to the event correspondence information stored in a storage means, exhibiting correspondence of an event occurred in each of the operation target regions to a piece of event information for each of the operation target regions, in a case where an indicated coordinate, which is a coordinate of a position indicated by the pointer, is judged to have entered and/or exited any operation target region by deciding whether the indicated coordinate is within any of the operation target regions or not.

To achieve the above object, an input control method according to a forth aspect of the present invention includes:

an image transmitting step where a server transmits image information showing an image including operation target regions to an input control device connected with the server via a network;

an image receiving step where the input control device receives the image information from the server;

an image displaying step where the input control device displays the image including operation target regions on a touch panel display based on the image information;

an operation recognition step where the input control device acquires a contact coordinate indicating a position at which a user has touched the touch panel display, a pointer displaying step where the input control device displays a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector;

a position transmitting step where the input control device transmits positional information including an indicated coordinate, which is a coordinate of a position indicated by the pointer, to the server;

a position receiving step where the server receives the positional information from the input control device;

an event information generation step where the server generates a piece of event information corresponding to an event occurred in an operation target region referring to the event correspondence information stored in a storage means exhibiting correspondence of an event occurred in each of the operation target regions to a piece of event information for each of the operation target regions, in a case where the indicated coordinate is judged to have entered and/or exited any operation target region by deciding based on the positional information whether the indicated coordinate is within any of the operation target regions or not; and an execution step where the server executes a processing corresponded to the event information referring to processing information stored in the storage means exhibiting correspondence of the event information to a processing.

To achieve the above object, a computer-readable recording medium according to a fifth aspect of the present invention, storing a program which has a computer function as:

an image display means for displaying an image including operation target regions on a touch panel display;

a storage means for storing event correspondence information exhibiting correspondence of an event occurred in each of the operation target regions to a piece of event information for each of the operation target regions;

an operation recognition means for recognizing a contact coordinate of a position at which a user has touched the touch panel display;

a pointer displaying means for displaying a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector; and an event information generation means for generating a piece of event information corresponding to an event occurred in an operation target region referring to the event correspondence information, in a case where an indicated coordinate, which is a coordinate of a position indicated by the pointer, is judged to have entered and/or exited any operation target region by deciding whether the indicated coordinate is within any of the operation target regions or not.

Advantageous Effects of Invention

According to the present invention, a user can easily point out an operation object displayed near an outer frame of a touch panel display with a pointer.

BRIEF DESCRIPTION OF DRAWINGS

FIG. 1 is a diagram showing an example of a display of a pointer by an input control device according to an exemplary embodiment 1 of the present invention.

FIG. 2A is a diagram showing another example of a display of the pointer by the input control device according to the exemplary embodiment 1.

FIG. 8A is a diagram showing another example of a display of the icon and the pointer by the input control device according to the exemplary embodiment 2.

FIG. 8B is a diagram showing another example of a display of the icon and the pointer by the input control device according to the exemplary embodiment 2.

FIG. 8D is a diagram showing another example of a display of the icon and the pointer by the input control device according to the exemplary embodiment 2.

FIG. 11B is a diagram illustrating a display of the icon and the pointer by the input control device according to the exemplary embodiment 3 of the present invention.

FIG. 11C is a diagram illustrating a display of the icon and the pointer by the input control device according to the exemplary embodiment 3 of the present invention.

FIG. 11D is a diagram illustrating a display of the icon and the pointer by the input control device according to the exemplary embodiment 3 of the present invention.

DESCRIPTION OF EMBODIMENTS

Exemplary Embodiment 1

An input control device and an input control method according to an exemplary embodiment of the present invention will be described below referring as an example to the input control device 1 shown in FIG. 1.

The input control device 1 includes a touch panel display TD.

The input control device 1 displays a pointer PO, operation target regions OB, and a window WI on the touch panel display TD as shown in FIG. 1.

When an event occurs in any of operation target regions OB, a piece of event information, which has been corresponded in advance to the event occurred in the operation target region OB, is generated. For example, when a user points out an optional operation target region OB with the pointer PO, or points out it with the pointer PO and tapped thereon, the input control device 1 detects the operation and generates event information corresponded in advance to the operation of pointing out the operation target region OB, or the operation of tapping on a pointed-out area.

The input control device 1 acquires a contact coordinate CO, which defines a position on the touch panel display TD touched by a user. Further, the input control device 1 executes an input control application program to display a pointer PO at a display position decided based on the contact coordinate CO as shown in FIG. 1.

To facilitate understanding, in FIG. 1 the contact coordinate CO is expressed by a filled circle and the center coordinate CE of the touch panel display TD is expressed by an X-mark. Further, a vector extending from the contact coordinate CO to the pointer PO (hereinafter referred to as "pointer vector CP") and a vector extending from the center coordinate CE of the touch panel display TD to the contact coordinate CO (hereinafter referred to as "contact point vector CC") are expressed by dashed dotted line arrows. Actually, the filled circle, the X-mark, and the dashed dotted line arrows will not be displayed.

The input control device 1 displays the pointer PO such that the direction of the pointer vector CP coincides with the direction of the contact point vector CC, and the magnitude of the pointer vector CP is proportional to the magnitude LC of the contact point vector CC as shown in FIG. 1. k is a proportionality constant that is larger than 1 in FIG. 1.

A user contacts the touch panel display TD and moves (drags) the contact position while keeping the contact to change the contact coordinate CO and move the pointer PO corresponding to the contact coordinate CO as shown in FIG. 2A to FIG. 2D.

Insofar as the input control device 1 displays the pointer PO in such a way, when the contact coordinate CO approaches the outer frame of the touch panel display TD, the pointer PO is automatically displayed near the outer frame of the touch panel display TD as shown in FIG. 1 and FIG. 2.

Figure 3:
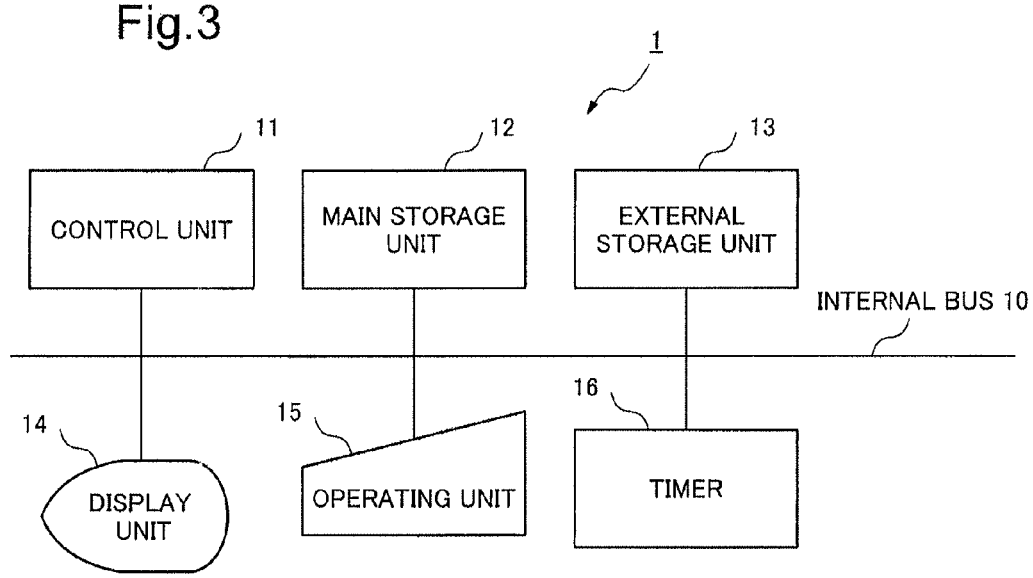
FIG. 3 is a block diagram showing an example of a hardware constitution of the input control device according to the exemplary embodiment 1.

The input control device 1 is provided as shown in FIG. 3 with a control unit 11, a main storage unit 12, an external storage unit 13, a display unit 14, an operating unit 15, a timer 16, and an internal bus 10 connecting the respective units each other.

The control unit 11 is configured with a CPU (Central Processing Unit) or the like and controls each unit in the input control device 1.

The control unit 11 exhibits various function of the input control device 1 by executing various programs, such as an input control application program stored in the external storage unit 13.

The main storage unit 12 is configured with a RAM (Random-Access Memory) or the like and stores temporarily various data and various programs. The main storage unit 12 functions as a work area of the control unit 11 by developing programs such as the input control application program stored in the external storage unit 13.

The external storage unit 13 is configured with a non-volatile memory, such as a flash memory, and stores stationarily various data and various programs such as the input control application program.

The display unit 14 is configured with a LCD (Liquid Crystal Display) or the like, and displays an image under the control of the control unit 11.

The operating unit 15 is configured with a touch-pad superposed on a LCD constituting the display unit 14 or the like to detect a touch by a user.

A LCD constituting the display unit 14 and a touch-pad constituting the operating unit 15 constitute a touch panel display TD.

The timer 16 delivers periodically current time to the control unit 11.

Figure 4:
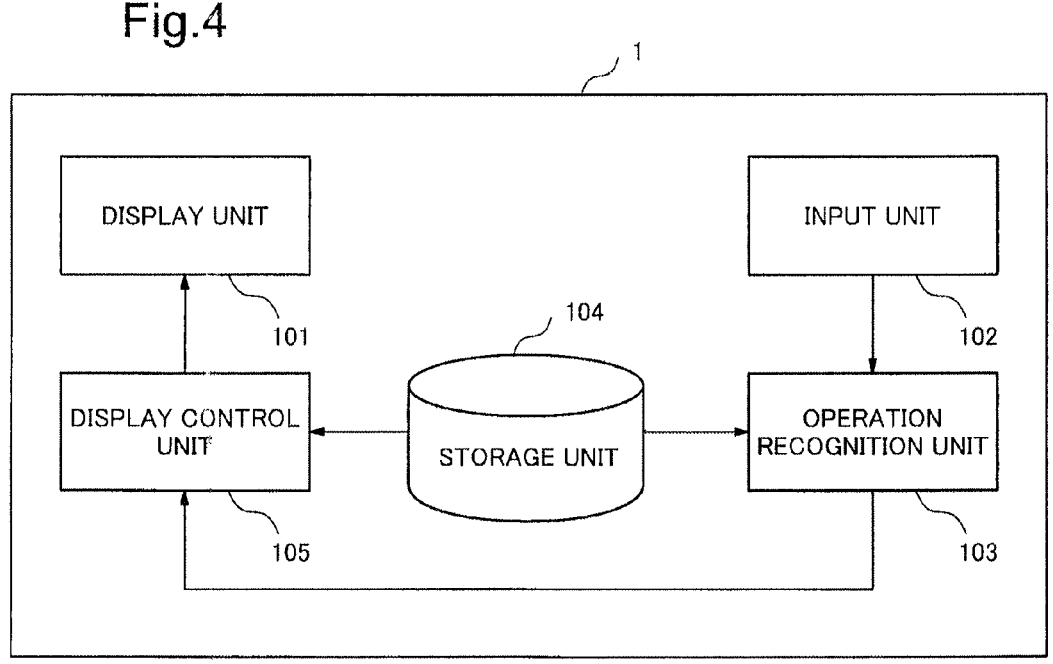
FIG. 4 is a block diagram showing an example of a functional constitution of the input control device according to the exemplary embodiment 1.

The input control device 1 with the above physical constitution is functionally provided as shown in FIG. 4 with a display unit 101, an input unit 102, an operation recognition unit 103, a storage unit 104, and a display control unit 105. In this regard, although the input control device 1 also includes a moving image regeneration function, only characteristic units are exhibited and other units are not illustrated in the diagram.

The display unit 101 displays an image under a control of the display control unit 105 described below.

The input unit 102 detects a touch by a user and accepts an input.

The operation recognition unit 103 acquires a physical position of a contact by a user on the touch panel display TD from the input unit 102. The operation recognition unit 103 converts the acquired physical position to a coordinate referring to the touch panel display coordinate information, and acquires the obtained coordinate as the contact coordinate CO. The touch panel display coordinate information is information for converting a physical position on the touch panel display TD to a coordinate and stored in the storage unit 104 described below. The operation recognition unit 103 sends the contact coordinate CO to the display control unit 105.

Further, the operation recognition unit 103 acquires a contact time, during which a user continues touching the touch panel display TD, based on detection of the touch by the input unit 102.

The storage unit 104 stores image information, touch panel display coordinate information, event correspondence information and processing information.

The image information is image information representing a pointer PO, a window WI or the like.

The touch panel display coordinate information is information for converting a physical position on the touch panel display TD to a coordinate.

The event correspondence information is information showing the correspondence between an event occurred in each operation target region OB and event information for each operation target region OB.

The processing information is information showing the correspondence between a piece of event information and a processing.

The display control unit 105 reads out image information from the storage unit 104, and has the display unit 101 display an image including a pointer PO, an operation target region OB, a window WI or the like.

The display control unit 105 displays the pointer PO based on a contact coordinate CO received from the operation recognition unit 103 by executing the input control application program. The pointer PO is displayed such that the direction of a pointer vector CP coincides with the direction of a contact point vector CC, and the magnitude of the pointer vector CP is proportional to the magnitude LC of the contact point vector CC.

In this regard, when the display control unit 105 does not execute the input control application program, it displays the pointer PO at a contact coordinate CO received from the operation recognition unit 103, or at a position apart from the contact coordinate CO by a predetermined distance.

A user drags a contact position, while keeping the contact to the touch panel display TD, to change a contact coordinate CO and move the pointer PO as shown in FIG. 2A to FIG. 2D.

Figure 2B:
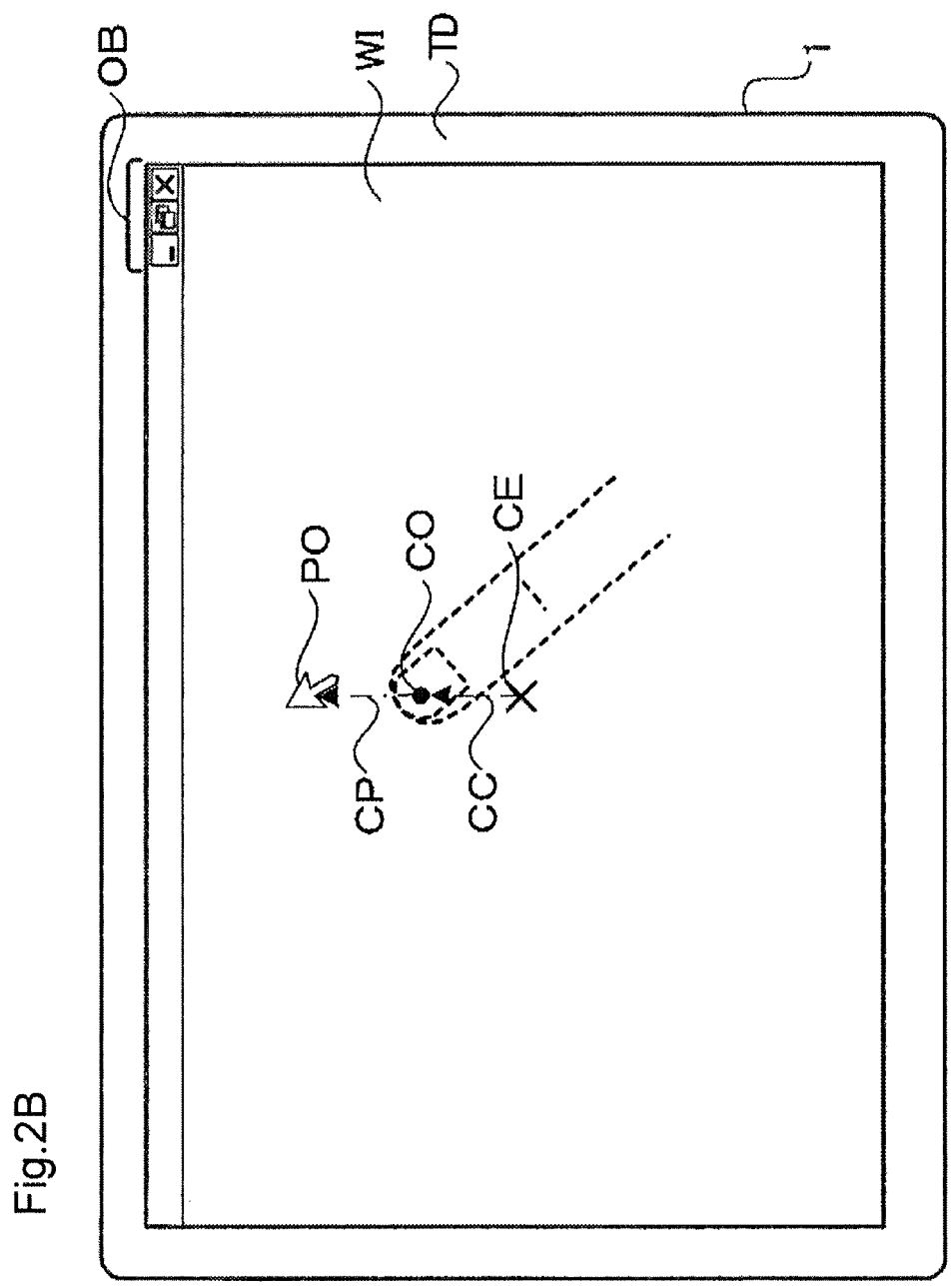
FIG. 2B is a diagram showing another example of a display of the pointer by the input control device according to the exemplary embodiment 1.
Figure 2C:
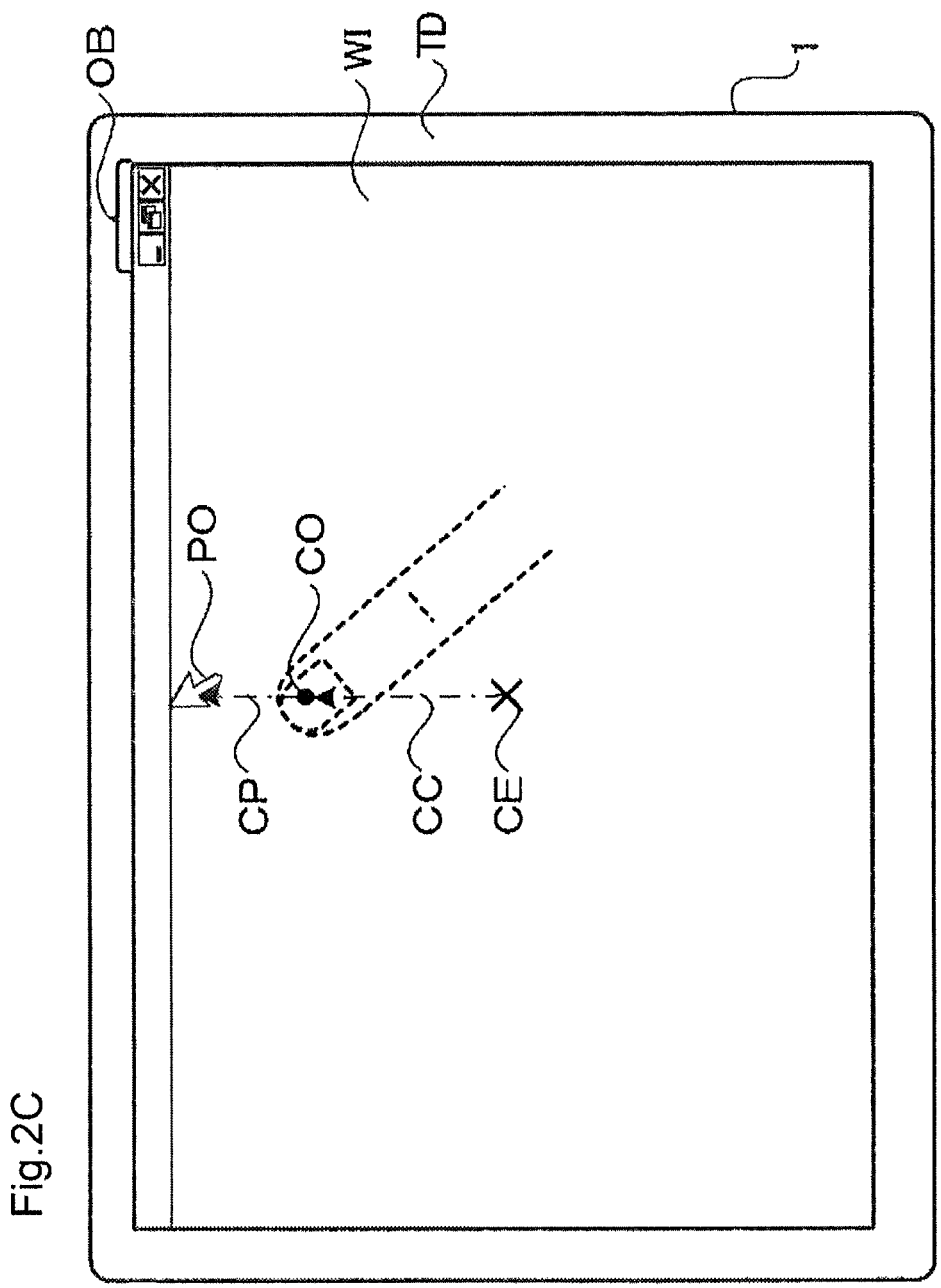
FIG. 2C is a diagram showing another example of a display of the pointer by the input control device according to the exemplary embodiment 1.
Figure 2D:
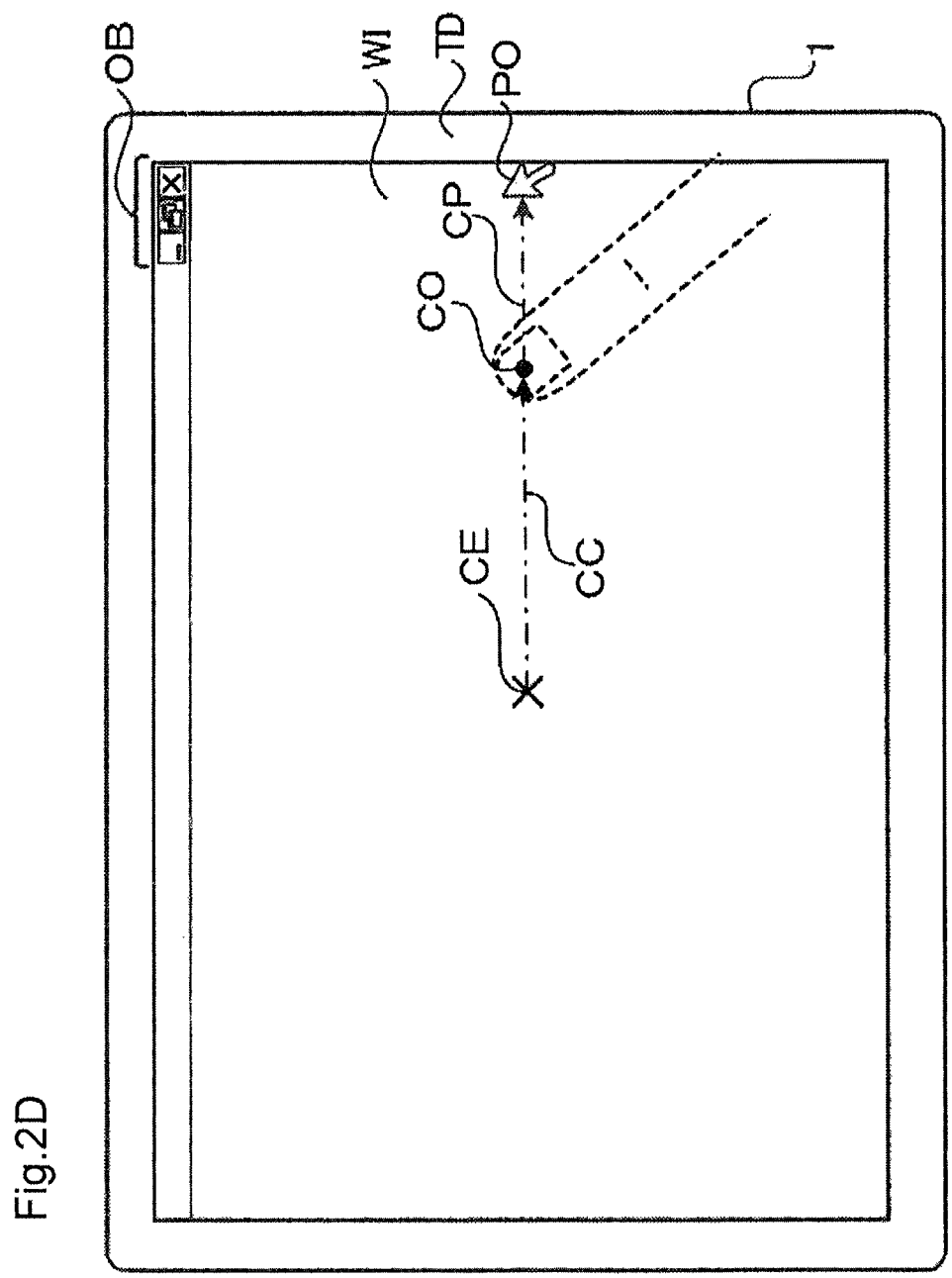
FIG. 2D is a diagram showing another example of a display of the pointer by the input control device according to the exemplary embodiment 1.

The display control unit 105 displays the pointer PO at an x-coordinate not lower than a threshold −Xp and not higher than a threshold Xp, and at a y-coordinate not lower than a threshold −Yp and not higher than a threshold Yp. By setting the thresholds −Xp, +Xp, −Yp, and +Yp, the following processing is carried out, when the pointer PO is displayed in contact with the outer frame of the touch panel display TD as shown in FIG. 2C or FIG. 2D. Namely, even when the contact coordinate CO approaches further to the outer frame of the touch panel display TD, the display control unit prohibits the pointer PO from being concealed further by the outer frame of the touch panel display TD.

The display control unit 105 decides whether a coordinate of a position indicated by the pointer PO (hereinafter referred to as "indicated coordinate") is included in an operation target region OB or not.

When the indicated coordinate enters an operation target region OB and/or exits an operation target region OB, the display control unit 105 refers, with respect to each operation target region OB, to event correspondence information presenting the correspondence between an event occurred in each operation target region OB and a piece of event information stored in the storage unit 104. Then, the display control unit 105 generates event information corresponding to the event occurred in the operation target region OB.

The display control unit 105 refers to processing information presenting the correspondence between a piece of event information and a processing stored in the storage unit 104, and, in a case where a processing is corresponded to the generated event information, executes the processing.

For example, when the indicated coordinate enters an operation target region OB1, such event information as "OB1-ON" is generated, and when the same exits the operation target region OB1, such event information as "OB1-OFF" is generated.

When the event information of "OB1-ON" is generated, the display control unit 105 refers to the processing information stored in the storage unit 104, and executes a processing corresponding to the event information of "OB1-ON". At the same time, the display control unit 105 reads out image information representing a processing scene corresponding to the processing from the storage unit 104 and has the display unit 101 display the processing scene.

In the case of a constitution, where the operation recognition unit 103 recognizes a contact time, the operation recognition unit 103 may decide whether a user has tapped or not, based on the contact time.

For example, the operation recognition unit 103 decides that a user has tapped, if the contact time is not less than a threshold α and not more than a threshold β. It can be prevented by setting the threshold α, that an erroneous decision of a tap from a short time contact occurring when a user unintendedly touches a touch panel display TD, and so on. Further, by setting the threshold β, when a user accidentally touches a touch panel display TD, the tap can be canceled by continuing the contact.

When the operation recognition unit 103 once decides that a user has tapped, it sends information to the effect that a user has tapped to the display control unit 105. When the display control unit 105 receives the information to the effect that a user has tapped, it generates, for example, event information of "tap". The display control unit 105 executes a processing corresponding to the event information of "tap" by referring to the processing information stored in the storage unit 104.

In this regard, instead of the display control unit 105 another functional unit included in the input control device 1 may execute a processing corresponding to the generated event information referring to the processing information.

Figure 5:
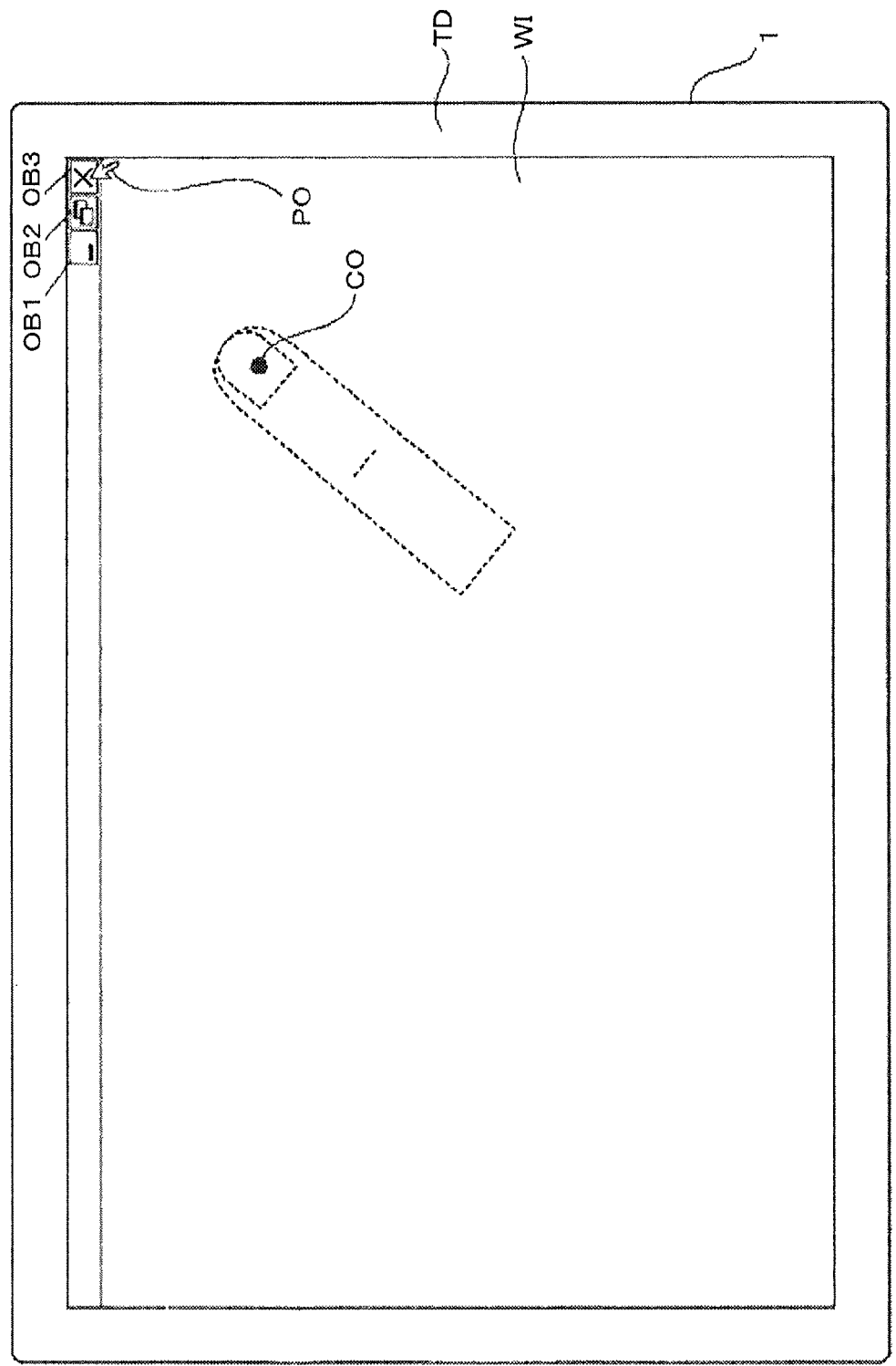
FIG. 5 is a diagram illustrating an action by which a user points out an operation target region with a pointer using the input control device according to the exemplary embodiment 1.

FIG. 5 is a diagram illustrating an action by which a user points out an operation target region using a pointer.

In the exemplary case in FIG. 5, the minimize button of a window WI is an operation target region OB1, the maximize button of a window WI is an operation target region OB2, and the close button of a window WI is an operation target region OB3.

When a window WI is maximized, the input control device 1 displays an operation target region OB 3, which is the close button of the window WI, in the upper right corner of the touch panel display TD as shown in FIG. 5.

When a user desires to operate the operation target region OB3, the user drags the contact position in a direction toward the upper right corner. The closer the contact position approaches to the upper right corner of the touch panel display TD, the closer approaches the pointer PO to the outer frame of the touch panel display TD. Therefore, a user can point out the operation target region OB3, which is the close button of the window WI, with the pointer PO as shown in FIG. 5 without moving a finger to the position of the operation target region OB3.

If a user points out the operation target region OB3 using the pointer PO, the indicated coordinate enters the operation target region OB3, and event information of "OB3-ON" is generated. If a user taps in a state where the operation target region OB3 is pointed out with the pointer PO, event information of "tap" is generated. The display control unit 105 refers to the processing information stored in the storage unit 104 and executes a processing corresponding to a combination of the event information of "OB3-ON" and "tap". After the execution of the processing, the window WI is closed.

In an operation target region OB there are OB3, which is the close button of the window WI or the like as shown in FIG. 5. Namely, there are an operation target region OB, which is activated to execute a corresponded processing in the event a user points out the region with the pointer PO and taps, and an operation target region OB, which is activated to execute a corresponded processing in the event a user only points out the region with the pointer PO.

Examples of the latter case include an icon, which pops up a help text, when a user points out the same using the pointer PO; a time display, which pops up a date display, when a user points out the same using the pointer PO; and an icon, which switches a display to a highlighted display, when a user points out the same using the pointer PO.

The action of the input control device 1 will be described below referring to FIG. 6. In this regard, the following description is focusing on characteristic actions of the input control device 1. Although detailed descriptions are omitted, the input control device 1 can execute various functions such as moving image regeneration.

Figure 6:
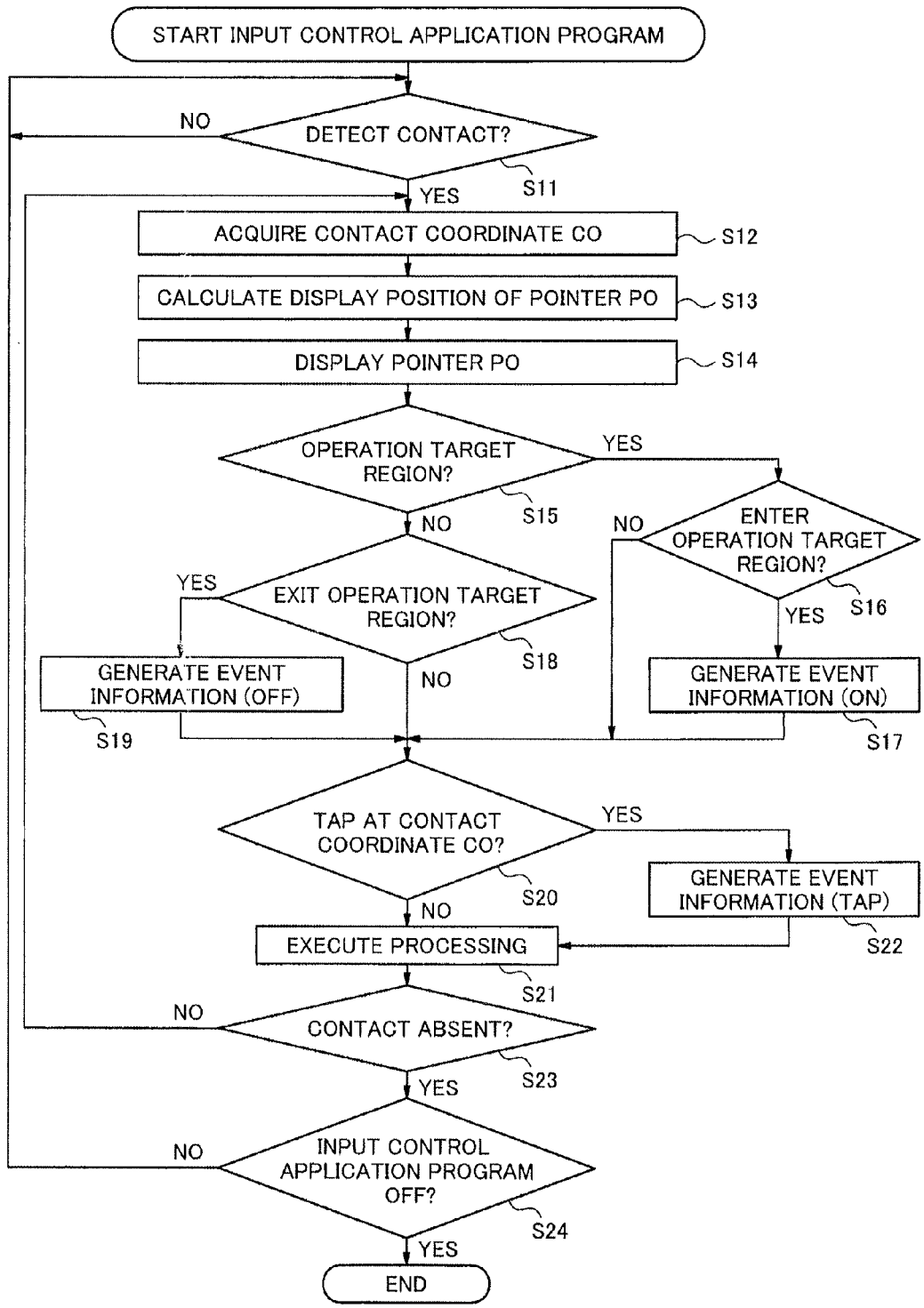
FIG. 6 is a flowchart showing an example of an action of the input control device according to the exemplary embodiment 1.

As soon as an input control application program is started, the input control device 1 initiates the processing shown in the flowchart of FIG. 6. According to the exemplary embodiment, the input control device 1 starts the input control application program, as soon as a power supply is initiated.

If the input unit 102 detects a contact by a user (step S11: YES), the operation recognition unit 103 acquires a physical position where the input unit 102 has detected the contact on the touch panel display TD, and refers to the touch panel display coordinate information stored in the storage unit 104. Then, the operation recognition unit 103 converts the acquired physical position to a coordinate, and acquires the coordinate as a contact coordinate CO (step S12). The operation recognition unit 103 sends the contact coordinate CO to the display control unit 105.

If the input unit 102 does not detect a contact (step S11: NO), step S11 is repeated.

The display control unit 105 calculates a display position of the pointer PO based on the contact coordinate CO received from the operation recognition unit 103 (step S13). The display position of the pointer PO is calculated such that the direction of the pointer vector CP coincides with the direction of the contact point vector CC, and the magnitude of the pointer vector CP is proportional to the magnitude LC of the contact point vector CC. The display control unit 105 displays the pointer PO at the display position calculated in step S13 (step S14).

The display control unit 105 decides whether an indicated coordinate (the coordinate of a position pointed by the pointer PO) is included in any of the operation target regions OB or not (step S15).

If the indicated coordinate is in any of the operation target regions OB (step S15: YES; step S16: YES), the display control unit 105 generates event information to the effect that the indicated coordinate has entered the operation target region OB by referring to the event correspondence information presenting the correspondence between an event occurred in each operation target region OB and a piece of event information for each operation target region OB stored in the storage unit 104 (step S17), and moves to step S20.

If the indicated coordinate has exited any of the operation target regions OB (step S15: NO; step S18: YES), the display control unit 105 generates event information to the effect that the indicated coordinate has exited the operation target region OB referring to the event correspondence information (step S19), and moves to step S20.

On the other hand, if the indicated coordinate does not enter any of the operation target regions OB (step S15: YES; step S16: NO), or if the indicated coordinate does not exits any of the operation target regions OB (step S15: NO; step S18: NO), the following processing is executed. Namely, the operation recognition unit 103 decides whether a user has tapped at the contact coordinate CO or not, based on the contact coordinate CO and the contact time (step S20).

If a user has not tapped at the contact coordinate CO (step S20: NO), the flow moves to step S21.

On the other hand, if a user has tapped at the contact coordinate CO (step S20: YES), the operation recognition unit 103 sends information to the effect that a user has tapped at the contact coordinate CO to the display control unit 105.

Upon receiving the information to the effect that a user has tapped at the contact coordinate CO from the operation recognition unit 103, the display control unit 105 generates event information to the effect that the contact coordinate CO has been tapped referring to the event correspondence information (step S22). The display control unit 105 refers to the processing information, and, if the event information generated in step S17, step S19, or step S22 is corresponded to any processing, executes the processing (step S21), and moves to step S23.

Insofar as the input unit 102 detects a contact (step S23: NO), step S12 to step S23 are repeated.

If the input unit 102 does not detect any more a contact (step S23: YES), it decides whether the input control application program is OFF or not (step S24). If the input control application program is not OFF (step S24: NO), step S11 to step S23 are repeated. If the input control application program becomes OFF (step S24: YES), the processing is ended.

With the input control device 1 according to the exemplary embodiment 1, when a contact position by a user approaches closer to the outer frame of the touch panel display TD, the closer approaches the pointer PO automatically to the outer frame of the touch panel display TD. Therefore, a user can point out easily with the pointer PO an operation target region OB displayed near the outer frame, especially near a corner of a four-cornered touch panel display TD.

According to the exemplary embodiment, the input control application program is started, as soon as the power supply to the input control device 1 is initiated. However, the start timing of the input control application program is not limited thereto.

The input control application program according to the exemplary embodiment is very effective in pointing out with the pointer PO an operation target region OB displayed near the outer frame of a touch panel display TD. Therefore, for example, when a user touches the touch panel display TD within a predetermined range from the outer frame, the input control application program is started automatically. Further, the pointer PO may be displayed such that the direction of the pointer vector CP coincides with the direction of the contact point vector CC, and the magnitude of the pointer vector CP is proportional to the magnitude LC of the contact point vector CC.

In this case, if the input control application program has not been started, or if the input control application program has been ended responding to an operation of a user, the pointer PO is displayed at a contact coordinate CO or at a position apart from the contact coordinate CO by a predetermined distance.

According to the exemplary embodiment, the pointer PO is displayed such that the direction of the pointer vector CP and the direction of the contact point vector CC completely coincide. However, the displaying method is not limited thereto, and the direction of the pointer vector CP and the direction of the contact point vector CC are required to coincide only roughly.

For example, a touch panel display TD is partitioned into a plurality of areas, and the direction of a pointer vector CP in each area may be set in a predetermined direction radiating from the center of the touch panel display TD.

According to the exemplary embodiment, the contact point vector CC is defined as a vector extending from the center coordinate CE of the touch panel display TD to the contact coordinate CO. However, the contact point vector CC may be a vector extending from an optional reference point on the touch panel to the contact coordinate CO. In this case, the input control device 1 displays the pointer PO such that the direction of a vector extending from a reference point to the contact coordinate CO coincides the direction of a vector extending from the contact coordinate CO to the pointer PO.

According to the exemplary embodiment, the pointer PO is displayed such that the magnitude of the pointer vector CP is proportional to the magnitude LC of the contact point vector CC. However, the displaying method of the pointer PO is not limited thereto, and the magnitude of the pointer vector CP is only required to increase in step with increase in the magnitude LC of the contact point vector CC.

For example, the pointer PO may be displayed such that the magnitude LC of the contact point vector CC and the magnitude LP of the pointer vector CP satisfies the relational expression $LP=k_n LC_n + k_{n-1} LC_{n-1} + \ldots + k_0 LC_0$ (in the expression, n and $k_n, k_{n-1}, \ldots, k_0$ are arbitrary constants).

Meanwhile, the arbitrary constants of n, and $k_n, k_{n-1}, \ldots, k_0$ are determined, for example, by experiments of correlation between the magnitude LC of the contact point vector CC and the magnitude LP of the pointer vector CP. The value are so selected that when a user drags a contact position in a partial region of the touch panel display TD (for example, a rectangular area occupying ⅔ to ⅘ of the rectangular touch panel display TD), the entire area of the touch panel display TD can be pointed out with the pointer PO. However, the determination method for the arbitrary constants of n, and $k_n, k_{n-1}, \ldots, k_0$ is not limited thereto, and they may be selected appropriately by an optional technique.

According to the exemplary embodiment, the pointer PO is displayed at a position calculated based on the contact coordinate CO as a reference. In a case where a contact by a user is not detected (step S11: NO), the pointer PO may be also displayed at a predetermined position. In this case, when a contact by a user is detected (step S11: YES), a contact coordinate CO is acquired to calculate a display position, and the pointer PO is displayed at the display position.

Exemplary Embodiment 2

An input control device 1 according to the exemplary embodiment 1 displays nothing at a contact coordinate CO. Therefore, a user who taps at the contact coordinate CO taps in an area where nothing is displayed on the touch panel display TD.

Figure 7:
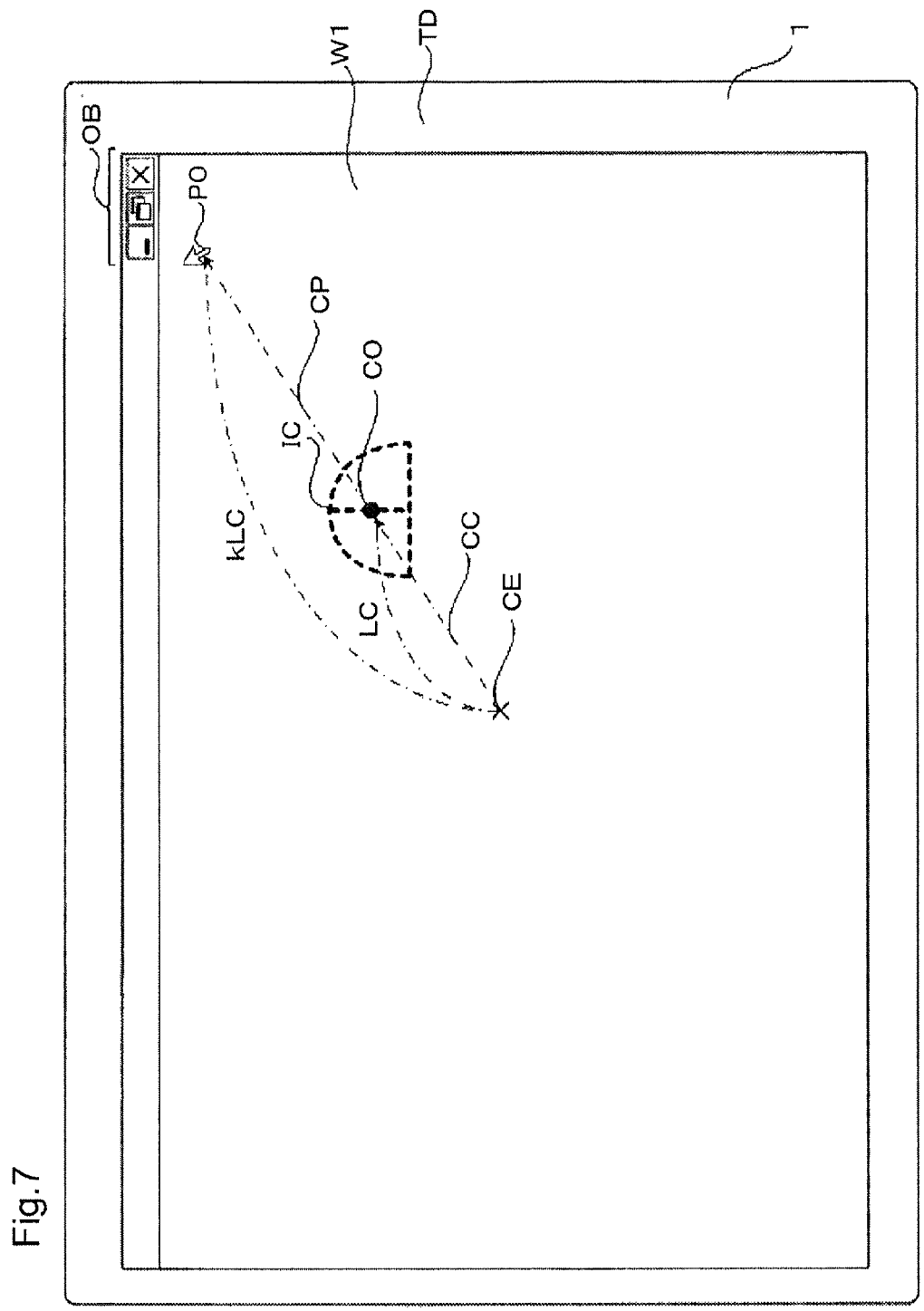
FIG. 7 is a diagram showing an example of a display of an icon and a pointer by an input control device according to an exemplary embodiment 2 of the present invention.
Figure 8C:
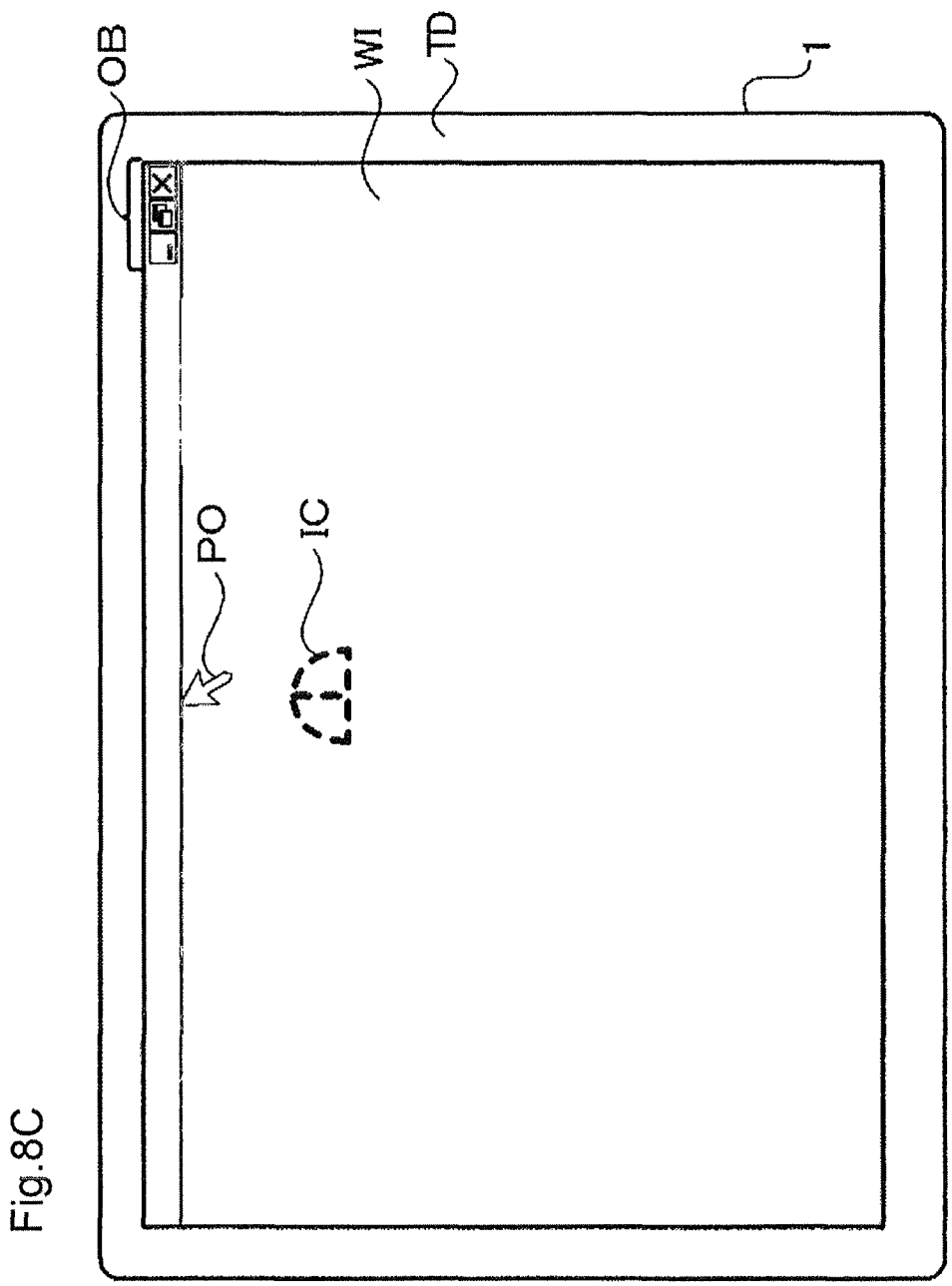
FIG. 8C is a diagram showing another example of a display of the icon and the pointer by the input control device according to the exemplary embodiment 2.

An input control device 1 of according to an exemplary embodiment 2 of the present invention displays an icon IC as shown in FIG. 7, so that a user can performs intuitively an operation such as tapping.

The input control device 1 acquires a contact coordinate CO which defines a position touched by a user on the touch panel display TD.

The input control device 1 displays an icon IC at the contact coordinate CO as shown in FIG. 7 by executing the input control application program. If an image of the window WI or the like is displayed at the contact coordinate CO, the icon is displayed superposed on the image.

Further, the input control device 1 decides a display position of the pointer PO based on the contact coordinate CO as a reference.

Specifically, the input control device 1 displays the pointer PO such that the direction of a vector extending from the contact coordinate CO to the pointer PO (pointer vector CP) coincides with the direction of a vector extending from the center coordinate CE of the touch panel display TD to the contact coordinate CO (contact point vector CC), and the magnitude of the pointer vector CP is proportional to the magnitude LC of the contact point vector CC as shown in FIG. 7. In FIG. 7 k is a proportionality constant.

Meanwhile, a filled circle representing the contact coordinate CO, dashed dotted line arrows representing the pointer vector CP and the contact point vector CC, and an X-mark representing the center coordinate CE in FIG. 7 are actually not displayed.

A user drags the icon IC by dragging the contact position on the touch panel display TD to move the pointer PO as shown in FIG. 8A to FIG. 8D.

By displaying the icon IC and the pointer PO according to the aforementioned method, when the display position of the icon IC (contact coordinate CO) approaches closer to the outer frame of the touch panel display TD, the closer approaches the pointer PO automatically to the outer frame of the touch panel display TD as shown in FIG. 8A to FIG. 8D.

Meanwhile, in a case where the pointer PO is displayed in contact with the outer frame of the touch panel display TD as shown in FIG. 8A and FIG. 8D, even if the display position of the icon IC (contact coordinate CO) approaches further to the outer frame of the touch panel display TD, the pointer PO is protected from being concealed further by the outer frame of the touch panel display TD.

The input control device 1 displays the icon IC translucently. To display translucently means that, when the icon IC is superposed on another image such as a window WI, the image superposed by the icon IC is displayed by calculating pixels as if seen through the icon IC.

The icon IC simulates, for example, the left button and the right button of a mouse as shown in FIG. 7.

Further, a user inputs an operation similar to a right click or a left click of a mouse by tapping the icon IC. The user can clearly recognize a position to be tapped by viewing the icon IC.

An input control device 1 of the exemplary embodiment 2 includes a hardware constitution, and a functional constitution similar to those of an input control device 1 of the exemplary embodiment 1. However, the functions and actions of the operation recognition unit 103 and the display control unit 105 are different from those of an input control device 1 of the exemplary embodiment 1.

Mainly the difference will be described below.

As soon as the input control application program starts, the display control unit 105 reads out the image data of the icon IC out of the storage unit 104, and has the display unit 101 display the same on the contact coordinate CO. If an image has been displayed at the contact coordinate CO, the display unit control unit 105 displays the icon IC superposed on the image. Since the icon IC is displayed translucently and the rear side image is visible through the icon IC, an operation is not obstructed.

A user drags a contact position, while keeping the contact to the touch panel display TD, to change a contact coordinate CO and drag the icon IC, thereby moving the pointer PO.

The display control unit 105 displays the pointer PO based on the contact coordinate CO received from the operation recognition unit 103 such that the direction of the pointer vector CP coincides with the direction of the contact point vector CC, and the magnitude of the pointer vector CP is proportional to the magnitude LC of the contact point vector CC.

According to the exemplary embodiment, the operation recognition unit 103 acquires a contact time, during which a user continues touching the touch panel display TD. The operation recognition unit 103 decides whether a user has tapped the icon IC or not, based on the contact coordinate CO and the contact time. If the operation recognition unit 103 decides that a user has tapped the icon IC, information to the effect that a user has tapped the icon IC is sent to the display control unit 105.

If the display control unit 105 receives the information to the effect that a user has tapped the icon IC from the operation recognition unit 103, it issues an event by generating event information to the effect that the icon IC has been tapped.

Figure 9:
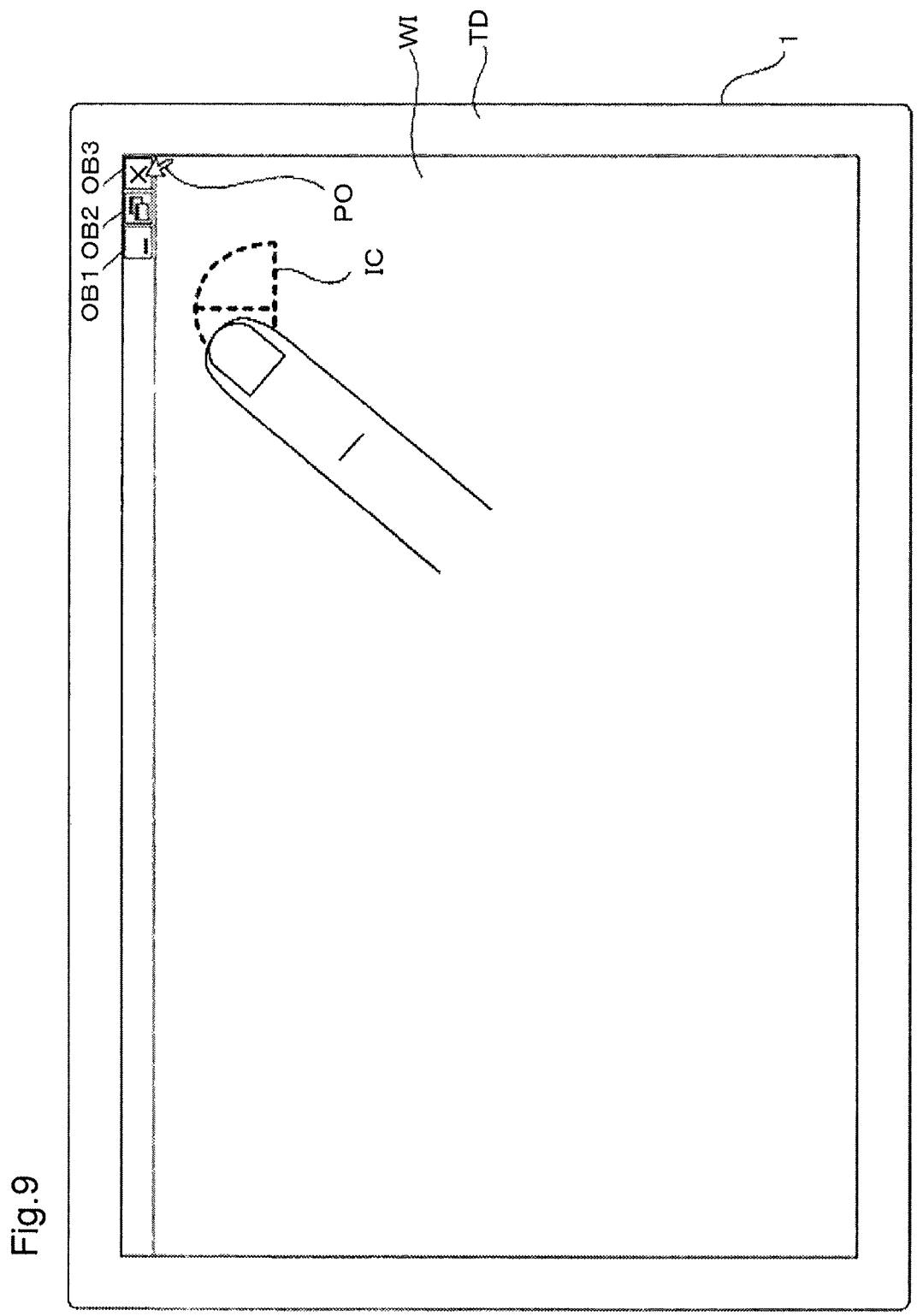
FIG. 9 is a diagram illustrating an action by which a user points out an operation target region with a pointer and taps using the input control device according to the exemplary embodiment 2.

FIG. 9 is a diagram illustrating an action by which a user points out an operation target region OB using the pointer PO and taps the icon IC.

In the example of FIG. 9, the minimize button of a window WI is the operation target region OB1, the maximize button of the window WI is the operation target region OB2, and the close button of the window WI is the operation target region OB3.

When a window WI is maximized, the operation target region OB3 which is the close button of the window WI is displayed in the upper right corner of the touch panel display D as shown in FIG. 9.

If a user intends to operate the operation target region OB3, the user drags the icon IC in a direction toward the upper right corner of the touch panel display TD. The closer the icon IC approaches to the upper right corner of the touch panel display TD, the closer approaches the pointer PO automatically to the outer frame of the touch panel display TD. Therefore, a user can point out the operation target region OB3 using the pointer PO as shown in FIG. 9 without moving a finger to the position of the operation target region OB3.

If a user points out the operation target region OB3 using the pointer PO, the event information of "OB3-ON" is generated.

If a user taps the icon IC in a state where the operation target region OB3 is pointed out using the pointer PO, the event information of "IC-tap" is generated.

The display control unit 105 refers to the processing information stored in the storage unit 104 and executes a processing corresponding to a combination of event information of "OB3-ON" and "IC-tap". After the execution of the processing, the window WI is closed.

The action of the input control device 1 according to the exemplary embodiment 2 will be described below referring to the flowchart in FIG. 10. In this regard, although the input control device 1 according to the exemplary embodiment 2 has various functions such as a moving image regeneration function, the following description is focusing on a characteristic action of the input control device 1 according to the exemplary embodiment 2.

Figure 10:
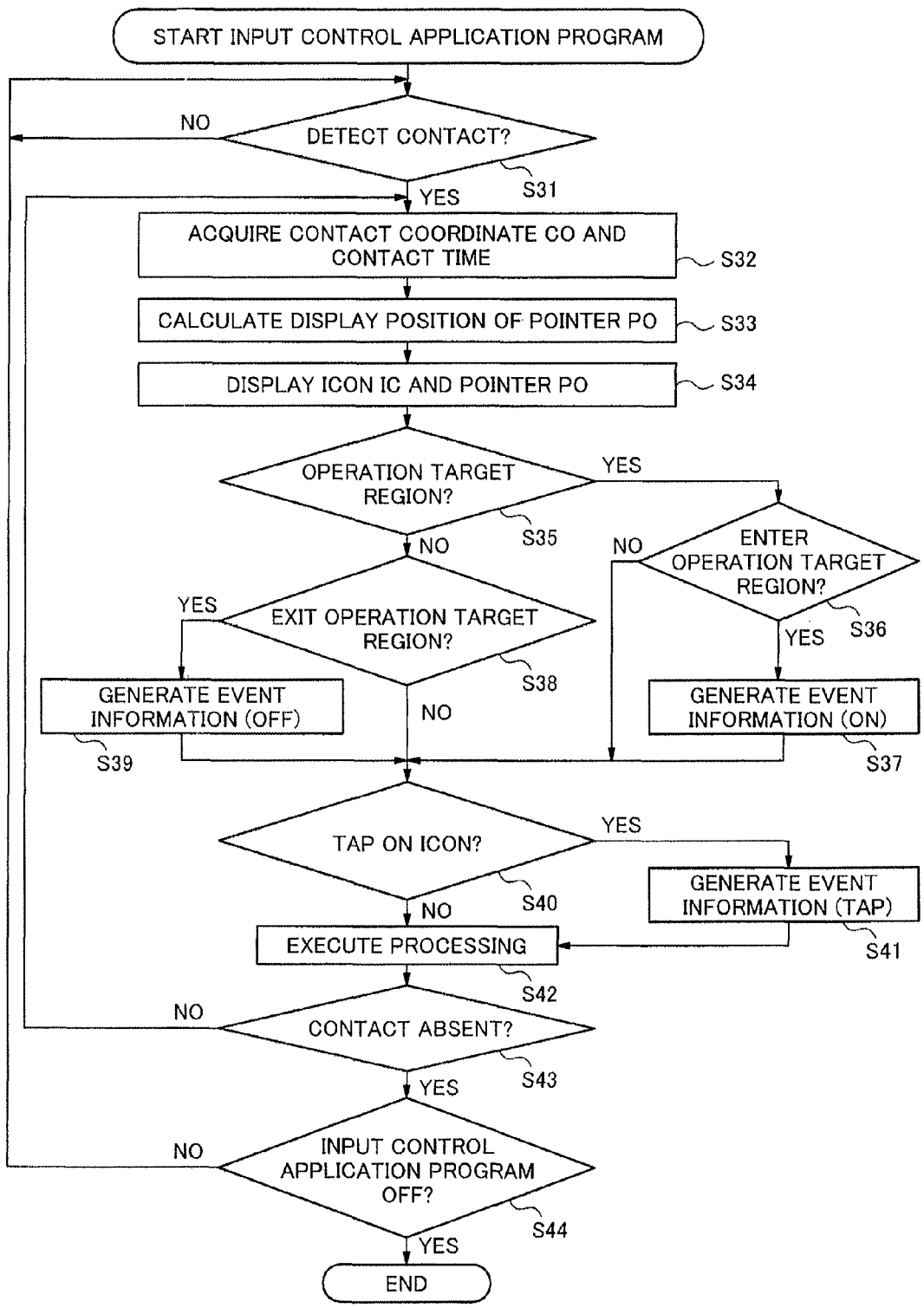
FIG. 10 is a flowchart showing an example of an action of the input control device according to the exemplary embodiment 2.
Figure 11A:
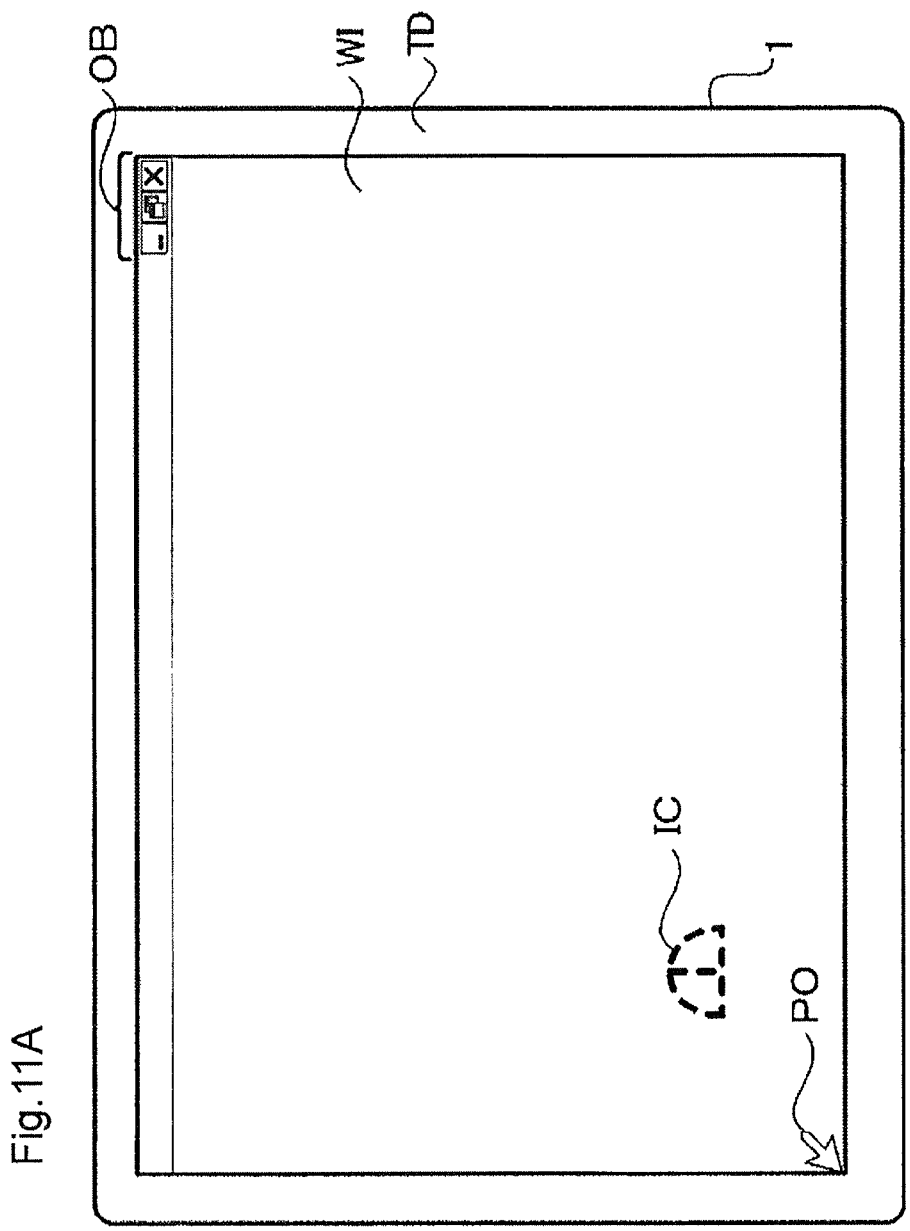
FIG. 11A is a diagram illustrating a display of an icon and a pointer by an input control device according to an exemplary embodiment 3 of the present invention.

As soon as an input control application program is started, the input control device 1 initiates the processing shown in the flowchart of FIG. 10. According to the exemplary embodiment, the input control device 1 starts the input control application program, as soon as a power supply is initiated.

If the input unit 102 detects a contact by a user (step S31: YES), the operation recognition unit 103 acquires a physical position where the input unit 102 has detected the contact on the touch panel display TD, and refers to the touch panel display coordinate information stored in the storage unit 104. Then, the operation recognition unit 103 converts the physical position to a coordinate, and acquires the coordinate as a contact coordinate CO as well as a contact time (step S32). The operation recognition unit 103 sends the contact coordinate CO and the contact time to the display control unit 105. If the input unit 102 does not detect a contact (step S31: NO), step S31 is repeated.

The display control unit 105 calculates a display position of the pointer PO based on the contact coordinate CO received from the operation recognition unit 103 such that the direction of the pointer vector CP coincides with the direction of the contact point vector CC, and the magnitude of the pointer vector CP is proportional to the magnitude LC of the contact point vector CC (step S33). The display control unit 105 reads out the image data of the pointer PO and the icon IC from the storage unit 104 and has the display unit 101 display the icon IC at the contact coordinate CO and the pointer PO at the display position calculated in step S33 (step S34).

The display control unit 105 decides whether an indicated coordinate, which is the coordinate of a position pointed by the pointer PO, is included in any of the operation target regions OB or not (step S35).

If the indicated coordinate enters any of the operation target regions OB (step S35: YES; step S36: YES), the display control unit 105 refers to the event correspondence information presenting the correspondence between an event occurred in each operation target region OB and a piece of event information for each operation target region OB stored in the storage unit 104. Then the display control unit 105 generates event information to the effect that the indicated coordinate enters the operation target region OB (step S37), and moves to step S40.

If the indicated coordinate exits any of the operation target regions OB (step S35: NO; step S38: YES), the display control unit 105 generates event information to the effect that the indicated coordinate exits the operation target region OB referring to the event correspondence information (step S39), and moves to step S40.

On the other hand, if the indicated coordinate is not in any of the operation target regions OB (step S35: YES; step S36: NO), the operation recognition unit 103 decides whether the icon IC has been tapped or not, based on the contact coordinate CO and the contact time (step S40). Meanwhile, if the indicated coordinate has not exited the operation target region OB (step S35: NO, step S38: NO), the operation recognition unit 103 also decides whether the icon IC has been tapped or not, based on the contact coordinate CO and the contact time (step S40).

If the icon IC has not been tapped (step S40: NO), the flow moves to step S42.

On the other hand if the icon IC has been tapped (step S40: YES), the operation recognition unit 103 sends information to the effect that a user has tapped the icon IC to the display control unit 105.

Upon receiving the information to the effect that a user has tapped the icon IC from the operation recognition unit 103, the display control unit 105 generates event information to the effect that the icon IC has been tapped (step S41). The display control unit 105 refers to the processing information, and, if the event information generated in step S37, step S39, or step S41 is corresponded to any processing, executes the processing (step S42), and moves to step S43.

Insofar as the input unit 102 detects a contact (step S43: NO), step S32 to step S43 are repeated.

If the input unit 102 does not detect any more a contact (step S43: YES), it decides whether the input control application program is OFF or not (step S44). If the input control application program is not OFF (step S44: NO), step S31 to step S44 are repeated. If the input control application program becomes OFF (step S44: YES), the processing is ended.

With an input control device 1 according to the exemplary embodiment 2, when a contact position on the touch panel display TD by a user approaches closer to the outer frame of the touch panel display TD, the closer approaches the pointer PO automatically to the outer frame. Therefore, a user can point out easily with the pointer PO an operation target region OB displayed near the outer frame, especially near a corner of a four-cornered touch panel display TD.

Further, by displaying an icon IC simulating a mouse, a user can performs intuitively an operation such as tapping.

Although, the icon IC is displayed at the contact coordinate CO according to the exemplary embodiment, the icon IC may be displayed at a position apart from the contact coordinate CO by a predetermined distance.

Further, in a case where a contact by a user is not detected (step S31: NO), the icon IC may be displayed at a predetermined position. In this case, when a contact by a user is detected (step S31: YES), and a contact coordinate CO is acquired, the icon IC is displayed at the contact coordinate.

According to the exemplary embodiment, it is only decided whether a user has tapped the icon IC or not, however, it may be further decided, which area of the icon IC a user has tapped. In this case, for each area of the icon IC an event occurred in each area is corresponded with a piece of event information, and a processing is corresponded with each piece of the event information.

Exemplary Embodiment 3

In the exemplary embodiments 1 and 2, a pointer PO with a shape of an arrow directed in a fixed direction is displayed.

The function and action of the input control device 1 according to an exemplary embodiment 3, in which an arrow-shaped pointer PO changes the direction according to a display position of the pointer PO, will be described below.

An input control device 1 of the exemplary embodiment 3 includes a hardware constitution, and a functional constitution similar to those of an input control device 1 of the exemplary embodiment 2. However, the function and action of the display control unit 105 are different from those of an input control device 1 of the exemplary embodiment 2.

Mainly the difference will be described below.

The display control unit 105 displays the pointer PO at a point where the direction of the pointer vector CP coincides with the direction of the contact point vector CC, and the magnitude of the pointer vector CP is proportional to the magnitude LC of the contact point vector CC, based on a contact coordinate CO received from the operation recognition unit 103 by executing the input control application program.

The display control unit 105 displays further the pointer PO such that the orienting direction of the arrow-shaped pointer PO and the direction of the contact point vector CC coincide as shown in FIG. 11A to FIG. 11D.

With an input control device 1 according to the exemplary embodiment 3, when a contact position on the touch panel display TD by a user approaches closer to the outer frame of the touch panel display TD, the closer approaches the pointer PO automatically to the outer frame, and the arrow-shaped pointer PO is oriented in a direction radiating from the center of the touch panel display TD. Therefore, a user can point out easily with the pointer PO an operation target region OB displayed near the outer frame of the touch panel display TD, especially near a corner of a four-cornered touch panel display TD.

According to the exemplary embodiment, the pointer PO is displayed such that the orienting direction of the arrow-shaped pointer PO coincides completely with the direction of the contact point vector CC. However, the display method of the pointer PO is not limited to the above, and it is only necessary that the orienting direction of the pointer PO coincides approximately with the direction of the contact point vector CC.

For example, the touch panel display TD is partitioned into a plurality of areas, and the orienting direction of the pointer PO in each area may be set in a predetermined direction radiating from the center of the touch panel display TD.

Meanwhile, the shape of the pointer PO is not limited to an arrow shape. For example, a triangular pointer PO may be displayed.

Exemplary Embodiment 4

According to the exemplary embodiments 1 to 3, the input control device 1 executes a series of processing, such as detection of a contact by a user, acquisition of a contact coordinate CO and a contact time, display position calculation for a pointer PO, display of a pointer PO or an icon IC, decision whether an indicated coordinate is included in an operation target region OB or not, issue of an event, and execution of a processing. However, a part of the processing may be carried out by a device other than the input control device 1.

A thin-client system 3 according to an exemplary embodiment 4, in which the input control device 1 and a server cooperate in executing a series of the processing, will be described below.

Figure 12:
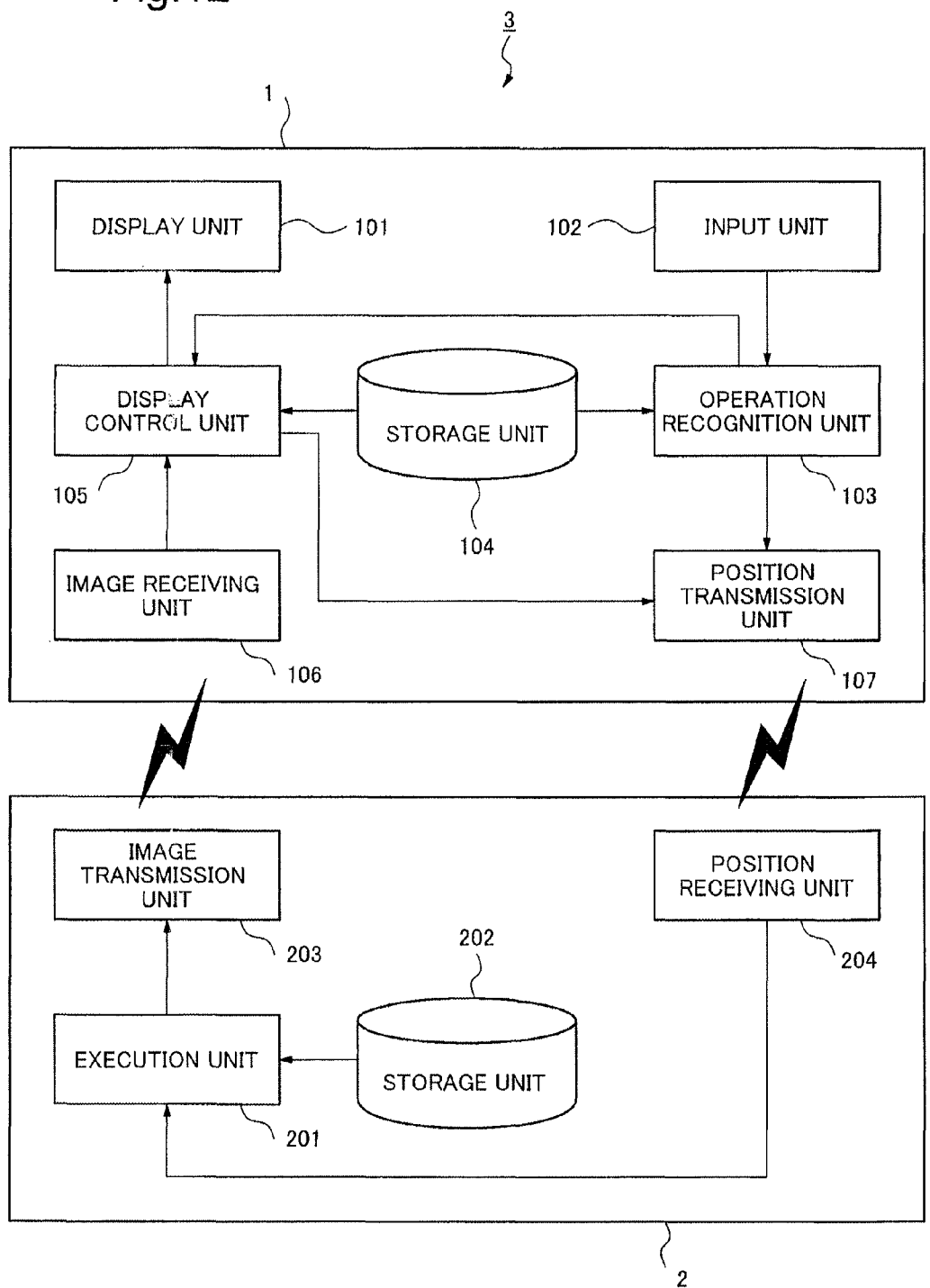
FIG. 12 is a block diagram showing an example of the constitution of a thin-client system according to an exemplary embodiment 4 of the present invention.

As shown in FIG. 12, the thin-client system 3 includes an input control device 1 and a server 2.

The input control device 1 includes a hardware constitution similar to the input control device 1 according to the exemplary embodiment 1, and further with a communication unit (not illustrated). The communication unit includes a network terminating unit or a wireless communication device for connection with a network, and a serial interface or a LAN (Local Area Network) interface. The communication unit connects with the server 2 through a network.

The input control device 1 includes a constitution similar to the input control device 1 according to the exemplary embodiment 1 in view of functions, and further includes an image receiving unit 106 and a position transmission unit 107. Moreover, a part of the function and action of the display control unit 105 is different from that in the input control device 1 according to the exemplary embodiment 1. Mainly the difference will be described below.

The image receiving unit 106 receives image information representing images of the window WI, the operation target region OB or the like from an image transmission unit 203 of the server 2. The display control unit 105 has the display unit 101 display images of the window WI, the operation target region OB or the like, based on the image information received by the image receiving unit 106.

In a state where an input application program is not executed, the display control unit 105 reads out image information on the pointer PO from the storage unit 104, and has the display unit 101 display the pointer PO at the contact coordinate CO received from the operation recognition unit 103, or at a position apart from the contact coordinate CO by a predetermined distance.

If the input control application program has started, the display control unit 105 displays the pointer PO such that the direction of the pointer vector CP coincides with the direction of the contact point vector CC, and the magnitude of the pointer vector CP is proportional to the magnitude LC of the contact point vector CC, based on the contact coordinate CO received from the operation recognition unit 103.

The display control unit 105 sends positional information including an indicated coordinate (the coordinate of a position indicated by the pointer PO) to the position transmission unit 107. The position transmission unit 107 transmits the positional information received from the display control unit 105 to a position receiving unit 204 of the server 2.

The server 2 includes an execution unit 201, a storage unit 202, an image transmission unit 203, and a position receiving unit 204.

The execution unit 201 of the server 2 reads out image information representing images including the window WI, and the operation target region OB from the storage unit 202, and sends the same to the image transmission unit 203, which transmits the same to the image receiving unit 106 of the input control device 1.

Upon receiving the positional information from the position transmission unit 107 of the input control device 1, the position receiving unit 204 sends the same to the execution unit 201. The execution unit 201 decides whether the indicated coordinate is included in the operation target region OB or not, based on the positional information received from the position receiving unit 204.

In a case where an indicated coordinate enters the operation target region OB, and/or exits the operation target region OB, the execution unit 201 refers to the event correspondence information presenting the correspondence between an event occurred in each operation target region OB and a piece of event information for each operation target region OB stored in the storage unit 202, and then generates event information corresponding to the event occurred in the operation target region OB.

The execution unit 201 refers to processing information presenting the correspondence between a piece of event information and a processing stored in the storage unit 202, and, in a case where a processing is corresponded to the generated event information, executes the processing.

The execution unit 201 reads out image information expressing a processing scene corresponding to an executed processing from the storage unit 202, and sends the same to the image transmission unit 203, which is then transmitted to the image receiving unit 106 of the input control device 1.

If the image receiving unit 106 of the input control device 1 receives from the image transmission unit 203 of the server 2 the image information expressing a processing scene, the display control unit 105 has the display unit 101 display the processing scene based on the image information.

According to the thin-client system 3 of the exemplary embodiment 4, the server 2 conducts a decision whether an indicated coordinate is included in the operation target region OB or not, issue of an event, execution of a processing or the like. Consequently, the processing load on the input control device 1 can be reduced. As the result, cost reduction or downsizing of the input control device 1 becomes possible.

In the case of a heretofore known thin-client system, if a server includes a display, a picture of the server display is displayed on the touch panel display of the input control device. In a case where the touch panel display of the input control device is smaller than the server display, the picture is displayed at a reduced scale and it may be sometimes difficult to operate an operation target region displayed near the outer frame of the touch panel display.

According to the thin-client system 3 of the exemplary embodiment 4, if a contact position by a user on the touch panel display TD provided by the input control device 1 approaches the outer frame of the touch panel display TD, the pointer PO is automatically displayed near the outer frame. Consequently, even if the picture is displayed at a reduced scale, the operation target region OB displayed near the outer frame of the touch panel display TD can be easily pointed out with the pointer PO.

According to the exemplary embodiment 4, the input control device 1 transmits positional information including an indicated coordinate to the server 2, and the server 2 decides whether the indicated coordinate is included in the operation target region OB or not,
and, in a case where an indicated coordinate enters the operation target region OB, and/or exits the operation target region OB, refers to the event correspondence information to generate a piece of event information corresponding to the event occurred in the operation target region OB.

However, the constitution of the thin-client system 3 is not limited to the above.

For example, the input control device 1 may decide whether an indicated coordinate is included in the operation target region OB or not, and, in a case where the indicated coordinate enters the operation target region OB and/or exits the operation target region OB, generate a piece of event information corresponding to an event occurred in the operation target region OB referring to the event correspondence information and send the same to the server 2. In this case the server 2 refers to the processing information, and, if the received event information is corresponded to a processing, executes the processing.

The hardware constitution or the flowchart is an example and may be changed or modified arbitrarily.

The input control device 1 and the thin-client system 3 can be actualized not only by a dedicated system, but also by an ordinary computer system. For example, a computer program for executing the actions of the input control device 1 and the thin-client system 3 may be stored in a computer-readable recording medium (flexible disk, CD-ROM, DVD-ROM or the like) and distributed, so that the computer program can be installed on a computer to constitute an input control device 1 and a thin-client system 3 which execute the processing. Alternatively, the computer program may be stored in a storage device of a server device in a communication network such as internet, which is then downloaded to an ordinary computer system to constitute the input control device 1 and the thin-client system 3.

Further, in a case where the functions of the input control device 1 and the thin-client system 3 are fulfilled through allotment between an OS and an application program, or through cooperation between an OS and an application program, only an application program may be stored in a recording medium or a storage device.

Further, it is possible to distribute a computer program superposed on a carrier wave through a communication network. For example, a computer program is posted on a bulletin board (BBS: Bulletin Board System) in a communication network, and the computer program may be distributed through the network. Then, it may be so constituted that the computer program is started and run under a control of an OS similarly as another application program, for executing the processing.

With respect to the present invention, various exemplary embodiments and alterations are possible without departing from the broad scope and spirit of the present invention. The particular exemplary embodiments disclosed above are illustrative only, and not intended to restrict the scope of the present invention. Namely, the scope of the present invention is set forth in the claims below, but not by the exemplary embodiments. All alterations made within the scope of the claims or the spirit of the invention the same are deemed to be within the scope of the present invention.

A part or all of the above the exemplary embodiments can be described also as the following Supplementary Notes, without limitation thereto.

(Supplementary Note 1) An input control device including:
a touch panel display;
an image display means for displaying an image including operation target regions on the touch panel display;
a storage means for storing event correspondence information exhibiting correspondence of an event occurred in each of the operation target regions to a piece of event information, in each of the operation target regions;
an operation recognition means for acquiring a contact coordinate of a position at which a user has touched the touch panel display;
a pointer displaying means for displaying a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector; and
an event information generation means for generating a piece of event information corresponding to an event occurred in an operation target region referring to the event correspondence information, in a case where an indicated coordinate, which is a coordinate of a position indicated by the pointer, is judged to have entered and/or exited any operation target region by deciding whether the indicated coordinate is within any of the operation target regions or not.

(Supplementary Note 2) The input control device according to claim 1, wherein
the operation recognition means acquires further a contact time, which is a time duration of a contact by a user with the touch panel display;
the input control device includes further a decision means for deciding whether the user has tapped the touch panel display according to the contact time; and
the event information generation means generates event information claiming occurrence of a tap by the user, in a case where the decision means has decided occurrence of tapping on the touch panel display by the user.

(Supplementary Note 3) The input control device according to claim 1 or 2 including further an icon display means which displays an icon at a position of the contact coordinate and changes the display position of the icon according to a change in the contact coordinate.

(Supplementary Note 4) The input control device according to any one of claims 1 to 3, wherein the pointer displaying means displays further the pointer such that the direction of the pointer orients nearly the same as the direction of the contact point vector.

(Supplementary Note 5) A thin-client system that has an input control device with a touch panel display and a server connected with the input control device via a network, including:
the server includes an image transmission means for transmitting image information showing an image including operation target regions to the input control device,
the input control device includes:
an image receiving means for receiving the image information from the server, an image display means for displaying the image including operation target regions on the touch panel display based on the image information, an operation recognition means for acquiring a contact coordinate of a position at which a user touched the touch panel display, a pointer displaying means for displaying a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector, and a position transmission means for transmitting positional information including an indicated coordinate, which is a coordinate of a position indicated by the pointer, to the server; and the server further includes a storage means for storing event correspondence information exhibiting correspondence of an event occurred in each of the operation target regions to a piece of event information in each of the operation target regions, and processing information exhibiting correspondence of the event information to a processing, a position receiving means for receiving the positional information from the input control device, an event information generation means for generating a piece of event information corresponding to an event occurred in an operation target region referring to the event correspondence information, in a case where the indicated coordinate is judged to have entered and/or exited any operation target region by deciding based on the positional information whether the indicated coordinate is within any of the operation target regions or not, and an execution means for executing a processing corresponded to the event information referring to the processing information.

(Supplementary Note 6) An input control method including:

an image displaying step for displaying an image including operation target regions on a touch panel display;

an operation recognition step for acquiring a contact coordinate of a position at which a user has touched the touch panel display;

a pointer displaying step for displaying a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector; and an event information generation step for generating a piece of event information corresponding to an event occurred in an operation target region referring to the event correspondence information stored in a storage means, exhibiting correspondence of an event occurred in each of the operation target regions to a piece of event information for each of the operation target regions, in a case where an indicated coordinate, which is a coordinate of a position indicated by the pointer, is judged to have entered and/or exited any operation target region by deciding whether the indicated coordinate is within any of the operation target regions or not.

(Supplementary Note 7) An input control method including:

an image transmitting step where a server transmits image information showing an image including operation target regions to an input control device connected with the server via a network;

an image receiving step where the input control device receives the image information from the server;

an image displaying step where the input control device displays the image including operation target regions on a touch panel display based on the image information;

an operation recognition step where the input control device acquires a contact coordinate indicating a position at which a user has touched the touch panel display, a pointer displaying step where the input control device displays a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector;

a position transmitting step where the input control device transmits positional information including an indicated coordinate, which is a coordinate of a position indicated by the pointer, to the server;

a position receiving step where the server receives the positional information from the input control device;

an event information generation step where the server generates a piece of event information corresponding to an event occurred in an operation target region referring to the event correspondence information stored in a storage means exhibiting correspondence of an event occurred in each of the operation target regions to a piece of event information for each of the operation target regions, in a case where the indicated coordinate is judged to have entered and/or exited any operation target region by deciding based on the positional information whether the indicated coordinate is within any of the operation target regions or not; and an execution step where the server executes a processing corresponded to the event information referring to processing information stored in the storage means exhibiting correspondence of the event information to a processing.

(Supplementary Note 8) A computer-readable recording medium storing a program which has a computer function as:

an image display means for displaying an image including operation target regions on a touch panel display;

a storage means for storing event correspondence information exhibiting correspondence of an event occurred in each of the operation target regions to a piece of event information for each of the operation target regions;

an operation recognition means for recognizing a contact coordinate of a position at which a user has touched the touch panel display;

a pointer displaying means for displaying a pointer such that the direction of a pointer vector extending from the contact coordinate to a pointer is nearly the same as the direction of a contact point vector extending from a reference point on the touch panel display to the contact coordinate, and the magnitude of the pointer vector increases according to an increase in the magnitude of the contact point vector; and an event information generation means for generating a piece of event information corresponding to an event occurred in an operation target region referring to the event correspondence information, in a case where an indicated coordinate, which is a coordinate of a position indicated by the pointer, is judged to have entered and/or exited any operation target region by deciding whether the indicated coordinate is within any of the operation target regions or not.

This application claims the benefit of priority to Japanese Patent Application No. 2012-192536 filed on 31 Aug. 2012. The entire disclosures of Japanese Patent Application No. 2012-192536 including description, claims, and drawings are hereby incorporated by reference.

REFERENCE SIGNS LIST

1 Input control device
2 Server
3 Thin-client system
10 Internal bus
11 Control unit
12 Main storage unit
13 External storage unit
14 Display unit
15 Operating unit
16 Timer
101 Display unit
102 Input unit
103 Operation recognition unit
104 Storage unit
105 Display control unit
106 Image receiving unit
107 Position transmission unit
201 Execution unit
202 Storage unit
203 Image transmission unit
204 Position receiving unit
K Proportionality constant
TD Touch panel display
WI Window
CC Contact point vector
CP Pointer vector
IC Icon
PO Pointer
CO Contact coordinate
CE Center coordinate
LC Magnitude of contact point vector
OB Operation target region
OB1 Minimize button
OB2 Maximize button
OB3 Close button

The invention claimed is:

1. An input control device comprising:
   a touch panel display;
   a memory device being configured to store data and a program; and
   a controller including a processor being configured to execute the program stored in the memory device, the controller configured to cause the input control device to:
   display an image including operation target regions on the touch panel display;
   store event correspondence information exhibiting correspondence of an event occurred in each of the operation target regions to a piece of event information, in each of the operation target regions, into the memory device;
   acquire a contact coordinate of a position at which a user has touched the touch panel display;
   display a pointer such that the direction of a pointer vector extending from the contact coordinate to the pointer is nearly the same as the direction of a contact point vector extending from a reference point on the touch panel display to the contact coordinate, and the magnitude of the pointer vector increases according to an increase in the magnitude of the contact point vector, and
   generate a piece of event information corresponding to an event occurred in an operation target region referring to the event correspondence information, in a case where an indicated coordinate, which is a coordinate of a position indicated by the pointer, is judged to have entered and/or exited any operation target region by deciding whether the indicated coordinate is within any of the operation target regions or not.

2. The input control device according to claim 1, wherein the controller is further configured to cause the input control device to:
   acquire a contact time, which is a time duration of a contact by a user with the touch panel display and to decide whether the user has tapped the touch panel display according to the contact time; and
   generate event information claiming occurrence of a tap by the user, in a case where the occurrence of tapping on the touch panel display by the user has been detected.

3. The input control device according to claim 1, wherein the controller is further configured to cause the input control device to:
   display an icon at a position of the contact coordinate and to change the display position of the icon according to a change in the contact coordinate.

4. The input control device according to claim 1, wherein the controller is further configured to cause the input control device to:
   display the pointer such that the direction of the pointer orients nearly the same as the direction of the contact point vector.

5. A thin-client system that has an input control device with a touch panel display and a server connected with the input control device via a network, comprising:
   the input control device comprising:
   a memory device being configured to store data and a program;
   a communication interface being connected to the network; and
   a controller including a processor being configured to execute the program stored in the memory device, the controller configured to cause the input control device to:
   receive an image information showing an image including operation target regions, from the server via the network, by use of the communication interface,
   display the image including operation target regions on the touch panel display based on the image information,
   acquire a contact coordinate of a position at which a user touched the touch panel display,
   display a pointer such that the direction of a pointer vector extending from the contact coordinate to the pointer is nearly the same as the direction of a contact point vector extending from a reference point on the touch panel display to the contact coordinate, and the magnitude of the pointer vector increases according to an increase in the magnitude of the contact point vector, and
   transmit positional information including an indicated coordinate, which is a coordinate of a position indicated by the pointer, to the server via the network, by use of the communication interface;

and the server comprising a computer that is configured to execute a computer program executable on the server, the computer program executable on the server configured to cause the server to:

transmit the image information to the input control device via the network, store event correspondence information exhibiting correspondence of an event occurred in each of the operation target regions to a piece of event information in each of the operation target regions, and processing information exhibiting correspondence of the event information to a processing, receive the positional information from the input control device via the network, generate a piece of event information corresponding to an event occurred in an operation target region referring to the event correspondence information, in a case where the indicated coordinate is judged to have entered and/or exited any operation target region by deciding based on the positional information whether the indicated coordinate is within any of the operation target regions or not, and execute a processing corresponding to the event information referring to the processing information.

6. An input control method comprising:

displaying an image including operation target regions on a touch panel display;

acquiring a contact coordinate of a position at which a user has touched the touch panel display;

displaying a pointer such that the direction of a pointer vector extending from the contact coordinate to the pointer is nearly the same as the direction of a contact point vector extending from a reference point on the touch panel display to the contact coordinate, and the magnitude of the pointer vector increases according to an increase in the magnitude of the contact point vector; and generating a piece of event information corresponding to an event occurred in an operation target region referring to the event correspondence information stored in a storage unit, exhibiting correspondence of an event occurred in each of the operation target regions to a piece of event information for each of the operation target regions, in a case where an indicated coordinate, which is a coordinate of a position indicated by the pointer, is judged to have entered and/or exited any operation target region by deciding whether the indicated coordinate is within any of the operation target regions or not.

7. An input control method comprising:

an image transmitting step where a server transmits image information showing an image including operation target regions to an input control device connected with the server via a network;

an image receiving step where the input control device receives the image information from the server;

an image displaying step where the input control device displays the image including operation target regions on a touch panel display based on the image information;

an operation recognition step where the input control device acquires a contact coordinate indicating a position at which a user has touched the touch panel display, a pointer displaying step where the input control device displays a pointer such that the direction of a pointer vector extending from the contact coordinate to the pointer is nearly the same as the direction of a contact point vector extending from a reference point on the touch panel display to the contact coordinate, and the magnitude of the pointer vector increases according to an increase in the magnitude of the contact point vector;

a position transmitting step where the input control device transmits positional information including an indicated coordinate, which is a coordinate of a position indicated by the pointer, to the server;

a position receiving step where the server receives the positional information from the input control device;

an event information generation step where the server generates a piece of event information corresponding to an event occurred in an operation target region referring to the event correspondence information stored in a storage unit exhibiting correspondence of an event occurred in each of the operation target regions to a piece of event information for each of the operation target regions, in a case where the indicated coordinate is judged to have entered and/or exited any operation target region by deciding based on the positional information whether the indicated coordinate is within any of the operation target regions or not; and an execution step where the server executes a processing corresponding to the event information referring to processing information stored in the storage unit exhibiting correspondence of the event information to a processing.

8. A non-transitory computer-readable recording medium storing a program which has a computer function as:

displaying an image including operation target regions on a touch panel display;

storing event correspondence information exhibiting correspondence of an event occurred in each of the operation target regions to a piece of event information for each of the operation target regions;

recognizing a contact coordinate of a position at which a user has touched the touch panel display;

displaying a pointer such that the direction of a pointer vector extending from the contact coordinate to the pointer is nearly the same as the direction of a contact point vector extending from a reference point on the touch panel display to the contact coordinate, and the magnitude of the pointer vector increases according to an increase in the magnitude of the contact point vector; and generating a piece of event information corresponding to an event occurred in an operation target region referring to the event correspondence information, in a case where an indicated coordinate, which is a coordinate of a position indicated by the pointer, is judged to have entered and/or exited any operation target region by deciding whether the indicated coordinate is within any of the operation target regions or not.

9. An input control device comprising:

a touch panel display;

an image display means for displaying an image including operation target regions on the touch panel display;

a storage means for storing event correspondence information exhibiting correspondence of an event occurred in each of the operation target regions to a piece of event information, in each of the operation target regions;

an operation recognition means for acquiring a contact coordinate of a position at which a user has touched the touch panel display;

a display control means for displaying a pointer such that the direction of a pointer vector extending from the contact coordinate to the pointer is nearly the same as the direction of a contact point vector extending from a reference point on the touch panel display to the contact coordinate, and the magnitude of the pointer vector increases according to an increase in the magnitude of the contact point vector, and for generating a piece of event information corresponding to an event occurred in an operation target region referring to the event correspondence information, in a case where an indicated coordinate, which is a coordinate of a position indicated by the pointer, is judged to have entered and/or exited any operation target region by deciding whether the indicated coordinate is within any of the operation target regions or not.

* * * * *